(12) United States Patent
Tominaga et al.

(10) Patent No.: US 11,314,350 B2
(45) Date of Patent: Apr. 26, 2022

(54) DISPLAY DEVICE INCLUDING POSITION INPUT FUNCTION

(71) Applicant: Sharp Kabushiki Kaisha, Osaka (JP)

(72) Inventors: Masakatsu Tominaga, Sakai (JP); Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/072,085

(22) Filed: Oct. 16, 2020

(65) Prior Publication Data

US 2021/0117031 A1 Apr. 22, 2021

Related U.S. Application Data

(60) Provisional application No. 62/924,263, filed on Oct. 22, 2019.

(51) Int. Cl.

| G06F 3/041 | (2006.01) |
|---|---|
| G02F 1/1333 | (2006.01) |
| G02F 1/1343 | (2006.01) |
| G02F 1/1335 | (2006.01) |
| G06F 3/044 | (2006.01) |
| G09G 3/36 | (2006.01) |

(52) U.S. Cl.
CPC ........ *G06F 3/0412* (2013.01); *G02F 1/13338* (2013.01); *G02F 1/133345* (2013.01); *G02F 1/133512* (2013.01); *G02F 1/134309* (2013.01); *G06F 3/0443* (2019.05); *G06F 3/04164* (2019.05); *G09G 3/3648* (2013.01)

(58) Field of Classification Search
CPC ................ G06F 3/041–048; G09G 3/36–3696
See application file for complete search history.

(56) References Cited

U.S. PATENT DOCUMENTS

| 2018/0059832 A1* | 3/2018 | Cho ....................... G06F 3/0446 |
| 2019/0204972 A1* | 7/2019 | Shin .................... G02F 1/13338 |
| 2020/0033684 A1 | 1/2020 | Tanaka et al. |
| 2021/0223646 A1* | 7/2021 | He ....................... G09G 3/3607 |

FOREIGN PATENT DOCUMENTS

WO 2018/181665 A1 10/2018

* cited by examiner

*Primary Examiner* — Roy P Rabindranath
(74) *Attorney, Agent, or Firm* — Keating & Bennett, LLP

(57) ABSTRACT

A display device including a position input function includes a pixel, a pixel line extending so as to pass transversely across a display area, a signal supply unit connected to the pixel line, a first position detecting electrode placed in a first area A1 beside the signal supply unit, a second position detecting electrode placed in a second area on a side opposite to the signal supply unit, a first position detecting line placed so as to overlap the pixel line in the first area and connected to the signal supply unit and the first touch electrode, and a second position detecting line placed so as to overlap the pixel line in such a manner as to lie astride the first area and the second area and connected to the signal supply unit and the second position detecting electrode.

11 Claims, 15 Drawing Sheets

DISPLAY DEVICE INCLUDING POSITION INPUT FUNCTION

TECHNICAL FIELD

The technology disclosed herein relates to a display device including a position input function.

BACKGROUND ART

A known example of a conventional display device is described in PTL 1 listed below. The display device described in PTL 1 includes a gate line, a source line, a drive element connected to the gate line and the source line, a pixel electrode connected to the drive element, and a color filter provided in correspondence with the pixel electrode. One pixel electrode corresponds to one subpixel, and a plurality of the subpixels constitute one pixel. The display device further includes, in a pixel area, a wire extended along either the gate line or the source line. At least a part of the wire is disposed in a pixel opening of the subpixel. Such wires are placed at pitches that are larger than pixel pitches.

CITATION LIST

Patent Literature

[PTL 1] International Publication No. 2018/181665

Technical Problem

PTL 1, listed above, describes a display device including a common electrode that also functions as a touch sensor and a sensor line connected to the common electrode through a contact hole. Each of such sensor lines is disposed for four subpixels. For this reason, there is a risk that an increase in the number of common electrodes in an attempt to bring about improvement in touch detection accuracy may lead to a lack of sensor lines. Further, undesirably, each of the sensor lines is configured to pass transversely across the vicinity of the center of a particular subpixel, and the subpixel decreases in opening area as much as the sensor line passes transversely.

SUMMARY OF DISCLOSURE

The technology described herein was made under such circumstances, and has as an object to bring about improvement in position detection accuracy.

Solution to Problem (1) According to the technology described herein, a display device including a position input function includes: a pixel; a pixel line through which to transmit a signal that is supplied to the pixel; a signal supply unit, connected to one end of the pixel line, that supplies a signal; a display area in which the pixel is placed so that an image is displayed and in which the pixel line is placed to extend so as to pass transversely across the display area, the display area being divided into a first area located beside the signal supply unit in a direction of extension of the pixel line and a second area located on a side opposite to the signal supply unit in the direction of extension; a first position detecting electrode, placed in the first area, that forms a capacitance with a position input body which performs position input and that detects an input position inputted by the position input body; a second position detecting electrode, placed in the second area, that forms a capacitance with the position input body and detects the input position; a first position detecting line placed so as to run parallel to the pixel line and overlap the pixel line in the first area and connected to the signal supply unit and the first position detecting electrode; and a second position detecting line placed so as to run parallel to the pixel line and overlap the pixel line in such a manner as to lie astride the first area and the second area and connected to the signal supply unit and the second position detecting electrode.

(2) Further, in addition to (1) described above, the display device including the position input function may further include: a lower conducting film; an upper conducting film placed at a higher layer than the lower conducting film; and an intermediate conducting film located midway between the lower conducting film and the upper conducting film. The first position detecting line may be composed of one of the lower conducting film and the upper conducting film. The second position detecting line may have a first area side second position detecting line constituting portion placed in the first area and composed of the other of the lower conducting film and the upper conducting film. The pixel line may be composed of the intermediate conducting film.

(3) Further, in addition to (2) described above, the display device including the position input function may be configured such that the first position detecting line is composed of the upper conducting film, and that the first area side second position detecting line constituting portion of the second position detecting line is composed of the lower conducting film.

(4) Further, in addition to (3) described above, the display device including the position input function may be configured such that the second position detecting line has a second area side second position detecting line constituting portion placed in the second area, and the second area side second position detecting line constituting portion has a second position detecting electrode connected portion, composed of the upper conducting film and connected to the second position detecting electrode, a part of which overlaps the first area side second position detecting line constituting portion and is connected to the first area side second position detecting line constituting portion through a relay contact hole bored through an insulating film sandwiched between the second position detecting electrode connected portion and the first area side second position detecting line constituting portion.

(5) Further, in addition to (4) described above, the display device including the position input function may be configured such that the second area side second position detecting line constituting portion has a second position detecting electrode unconnected portion composed of the lower conducting film, placed so as to overlap the second position detecting electrode connected portion, and concatenated to the first area side second position detecting line constituting portion.

(6) Further, in addition to (4) described above, the display device including the position input function may further include a non-position detecting line composed of the lower conducting film, placed so as to overlap the pixel line and the second area side second position detecting line constituting portion in the second area, and unconnected to the first area side second position detecting line constituting portion.

(7) Further, in addition to (6) described above, the display device function including the position input may be configured such that the non-position detecting line is supplied with a common potential.

(8) Further, in addition to any of (4) to (7) described above, the display device including the position input function may further include an intermediate electrode placed so as to overlap both the second position detecting electrode connected portion and the first area side second position detecting line constituting portion and composed of the intermediate conducting film. The intermediate electrode may be connected to the first area side second position detecting line constituting portion through a first relay contact hole, bored through an insulating film sandwiched between the intermediate electrode and the first area side second position detecting line constituting portion, that constitutes the relay contact hole, and is connected to the second position detecting electrode connected portion through a second relay contact hole, bored through an insulating film sandwiched between the intermediate electrode and the second position detecting electrode connected portion, that constitutes the relay contact hole.

(9) Further, in addition to any of (4) to (7) described above, the display device including the position input function may be configured such that the first area side second position detecting line constituting portion and the second position detecting electrode connected portion are directly connected to each other through the relay contact hole bored in a communicating manner through a plurality of insulating films sandwiched between the first area side second position detecting line constituting portion and the second position detecting electrode connected portion.

(10) Further, in addition to any of (4) to (9) described above, the display device including the position input function may further include a light shielding unit, placed so as to overlap at least both the first area side second position detecting line constituting portion and the second position detecting electrode connected portion, that blocks light.

(11) Further, in addition to any of (1) to (10) described above, the display device including the position input function may be configured such that the pixel has a longitudinal shape whose lateral direction coincides with the direction of extension, and that a plurality of the pixel lines, a plurality of the first position detecting lines, and a plurality of the second position detecting lines are placed side by side at spacings in a longitudinal direction of the pixel.

(12) Further, in addition to any of (1) to (11) described above, the display device including the position input function may further include: a third position detecting electrode that, when the display area is divided into the first area, the second area, and a third area located closer to the signal supply unit than the first area in the direction of extension, is placed in the third area, forms a capacitance with the position input body, and detects the input position; and a third position detecting line placed so as to run parallel to the pixel line and overlap the pixel line in the third area and connected to the signal supply unit and the third position detecting electrode. The first position detecting line may be placed in such a manner as to lie astride the first area and the third area. The second position detecting line may be placed in such a manner as to lie astride the first area, the second area, and the third area.

Advantageous Effects of Disclosure

The technology described herein makes it possible to bring about improvement in position detection accuracy.

DESCRIPTION OF EMBODIMENTS

Embodiment 1

Figure 1:
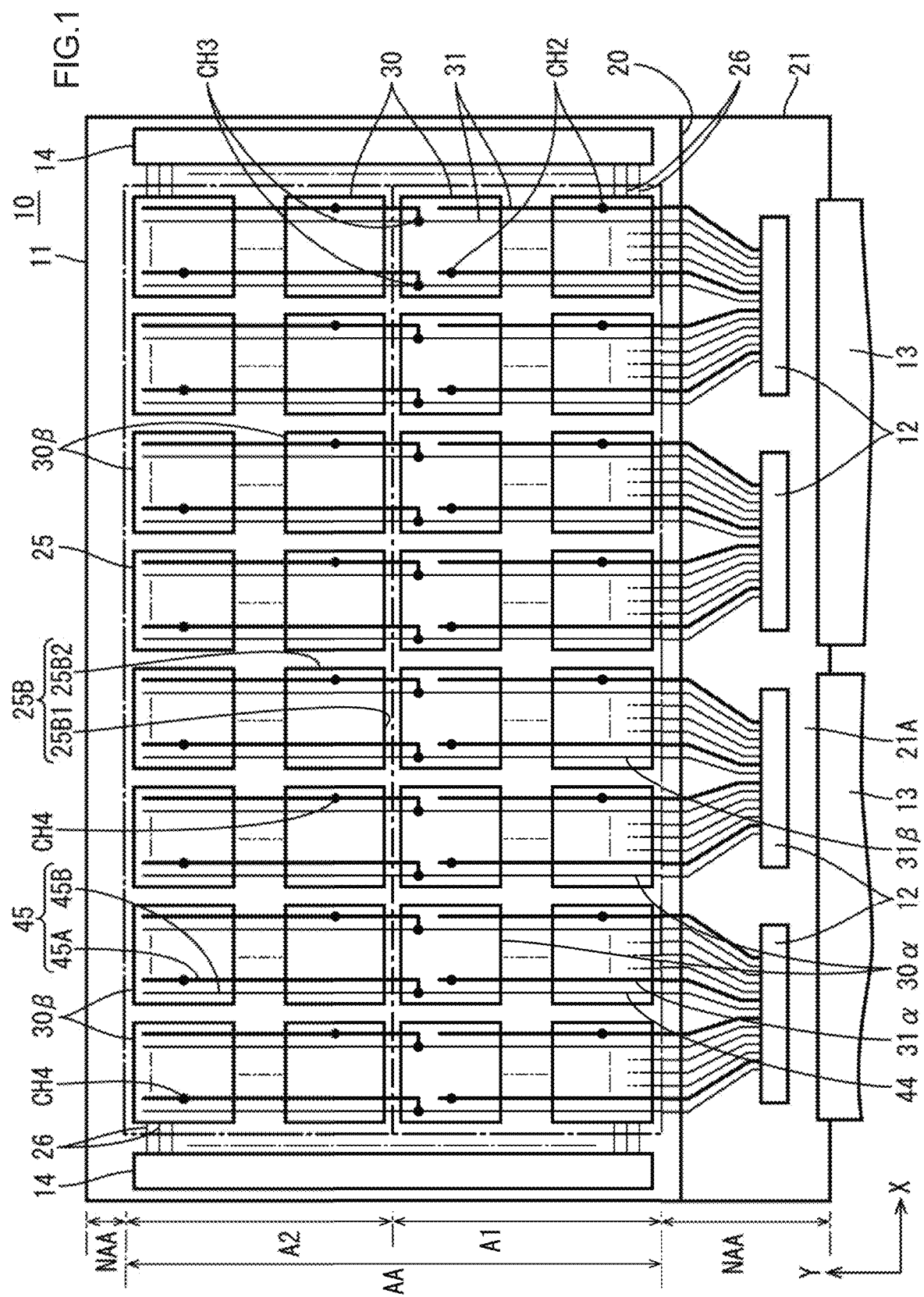
FIG. 1 is a plan view showing touch electrodes, touch lines, and the like of a liquid crystal panel with which a liquid crystal display device according to Embodiment 1 is provided.

Embodiment 1 is described with reference to FIGS. 1 to 10. The present embodiment illustrates a liquid crystal display device (display device including a position input function) 10 including a display function and a touch panel function (position input function). It should be noted that some of the drawings show an X axis, a Y axis, and a Z axis, and are drawn such that each of the axes extends in a corresponding one of the directions shown in the drawings. Further, FIGS. 3, 5, 6, 7, 8, 9, and 10 show front side up, and show back side down.

FIG. 1 is a schematic plan view of a liquid crystal panel 11. As shown in FIG. 1, the liquid crystal display device 10 includes at least the liquid crystal panel (display device, display panel, display panel including a position input function) 11, which has a horizontally long square shape and is capable of displaying an image, and a backlight device (lighting device) serving as an external light source that illuminates the liquid crystal panel 11 with light for use in display. The backlight device is disposed at the back of (behind) the liquid crystal panel 11, and has a light source (such as an LED) that emits a white color of light (white light), an optical member that, by imparting an optical effect to light from the light source, converts the light into planar light, and the like.

As shown in FIG. 1, the liquid crystal panel 11 has a screen whose central portion serves as a display area (i.e. an area surrounded by dot-and-dash lines in FIG. 1) AA in which an image is displayed. On the other hand, the screen of the liquid crystal panel 11 has a peripheral portion, formed in the shape of a frame surrounding the display area AA, that serves as a non-display area NAA in which no image is displayed. The liquid crystal panel 11 includes a pair of substrates 20 and 21 bonded together. A front (frontward) one of the two substrates 20 and 21 is a CF substrate (counter substrate) 20, and a back (backward) one of the two substrates 20 and 21 is an array substrate (active matrix substrate, element substrate) 21. The CF substrate 20 and the array substrate 21 are both formed by stacking various types of films at the side of an inner surface of a glass substrate. It should be noted that polarizing plates are attached to outer surfaces of the two substrates 20 and 21, respectively.

As shown in FIG. 1, the CF substrate 20 has short-side dimensions which are shorter than those of the array substrate 21, and is bonded to the array substrate 21 in such a manner that one end of the CF substrate 20 meets one end of the array substrate 21 in a short-side direction (Y-axis direction). Accordingly, the other end of the array substrate 21 in the short-side direction serves as a CF substrate non-overlap portion 21A that projects laterally from the CF substrate 20 and does not overlap the CF substrate 20. Mounted in this CF substrate non-overlap portion 21A are a driver (signal supply unit) 12 and a flexible substrate (signal supply unit) 13 for supplying various types of signal related to the after-mentioned display function or touch panel function. The driver 12 is composed of an LSI chip having a drive circuit inside, is mounted on the array substrate 13 by COG (Chip on Glass), and processes various types of signal that are transmitted by the flexible substrate 13. In the present embodiment, four drivers 12 are placed side by side at spacings along an X-axis direction in the non-display area NAA of the liquid crystal panel 11. The flexible substrate 13 is configured such that a large number of wiring patterns are formed on a base material composed of a synthetic resin material (such as polyimide resin) having insulating properties and flexibility. One end of the flexible substrate 13 is connected to the non-display area NAA, and the other end of the flexible substrate 13 is connected to a control substrate (signal supply source). Various types of signal that are supplied from the control substrate are transmitted to the liquid crystal panel 11 via the flexible substrate 13, processed by the driver 12 in the non-display area NAA, and then outputted toward the display area AA. In the present embodiment, the display area AA is divided into a first area A1 located beside the driver 12 in the Y-axis direction (down in FIG. 1) and a second area A2 located on a side opposite to the driver 12 in the Y-axis direction (up in FIG. 1). The first area A1 and the second area A2 is substantially equal in area ratio to each other. Further, provided in the non-display area NAA of the array substrate 21 are a pair of gate circuit units 14 between which the display area AA is interposed on both sides in the X-axis direction. The gate circuit units 14 serve to supply scanning signals to the after-mentioned gate line 26, and are monolithically provided in the array substrate 21.

The liquid crystal panel 11 according to the present embodiment has a combination of the display function of displaying an image and the touch panel function of detecting a position (input position) that a user inputs on the basis of an image being displayed, has integrated therewith (in an in-cell manner) a touch panel pattern for fulfilling the touch panel function. This touch panel pattern is of a so-called projected capacitive type, and adopts a self-capacitive detecting scheme. As shown in FIG. 1, the touch panel pattern is constituted by a plurality of touch electrodes (position detecting electrodes) 30 placed side by side in a matrix in a board surface of the liquid crystal panel 11. The touch electrodes 30 are placed in the display area AA of the liquid crystal panel 11. Accordingly, the display area AA of the liquid crystal panel 11 substantially coincides with a touch area (position input area) that is capable of detecting an input position, and the non-display area NAA substantially coincides with a non-touch area (non-position input area) that is incapable of detecting an input position. Moreover, when the user move his/her finger (position input body) as an electric conductor toward a surface (display surface) of the liquid crystal panel 11 in an attempt to do position input on the basis of an image that he/she views in the display area AA of the liquid crystal panel 11, capacitances are formed between the finger and touch electrodes 30. As a result, a capacitance that is detected by a touch electrode 30 located near the finger changes as the finger approaches, and becomes different from that which is detected by a touch electrode 30 located away from the finger, whereby it becomes possible to detect the input position.

As shown in FIG. 1, a plurality of the touch electrodes 30 are placed side by side at spacings in a matrix along the X-axis direction (i.e. a direction of arrangement of pixel electrodes 24 between which a touch line 31 is interposed) and the Y-axis direction (i.e. a direction of extension of the touch line 31) in the display area AA. Each of the touch electrodes 30 has a substantially square shape when seen in plan view, and has a dimension of approximately several millimeters (e.g. approximately 2 to 5 mm) on a side. Each of the touch electrodes 30 is much larger in planimetric size than the after-mentioned pixel PX, and is disposed in an area covering a plurality of (e.g. approximately several tens of) the pixels PX in the X-axis direction and the Y-axis direction. To the plurality of touch electrodes 30, a plurality of the touch lines (position detecting lines) 31 provided in the liquid crystal panel 11 are selectively connected. The touch line 31 extends along the Y-axis direction, and is selectively connected to a particular touch electrode 30 of a plurality of the touch electrodes 30 arranged along the Y-axis direction. It should be noted that FIG. 1 uses black circles to illustrate connection points (i.e. the after-mentioned contact holes CH2 and CH4) of the touch lines 31 with respect to the touch electrodes 30. Furthermore, the touch line 31 is connected to a detecting circuit. Although the present embodiment illustrates a case where a detecting circuit is provided in the driver 12, a detecting circuit may alternatively be provided outside the liquid crystal panel 11, for example, via the flexible substrate 13. In the present embodiment, one end of the touch line 31 is connected to the driver 12. It should be noted that FIG. 1 is a schematic representation of an array of the touch electrodes 30, and the specific number of touch electrodes 30 that are installed, the specific disposition of the touch electrodes 30, the specific planar shapes of the touch electrodes 30, and the like are subject to appropriate change other than those illustrated.

Figure 2:
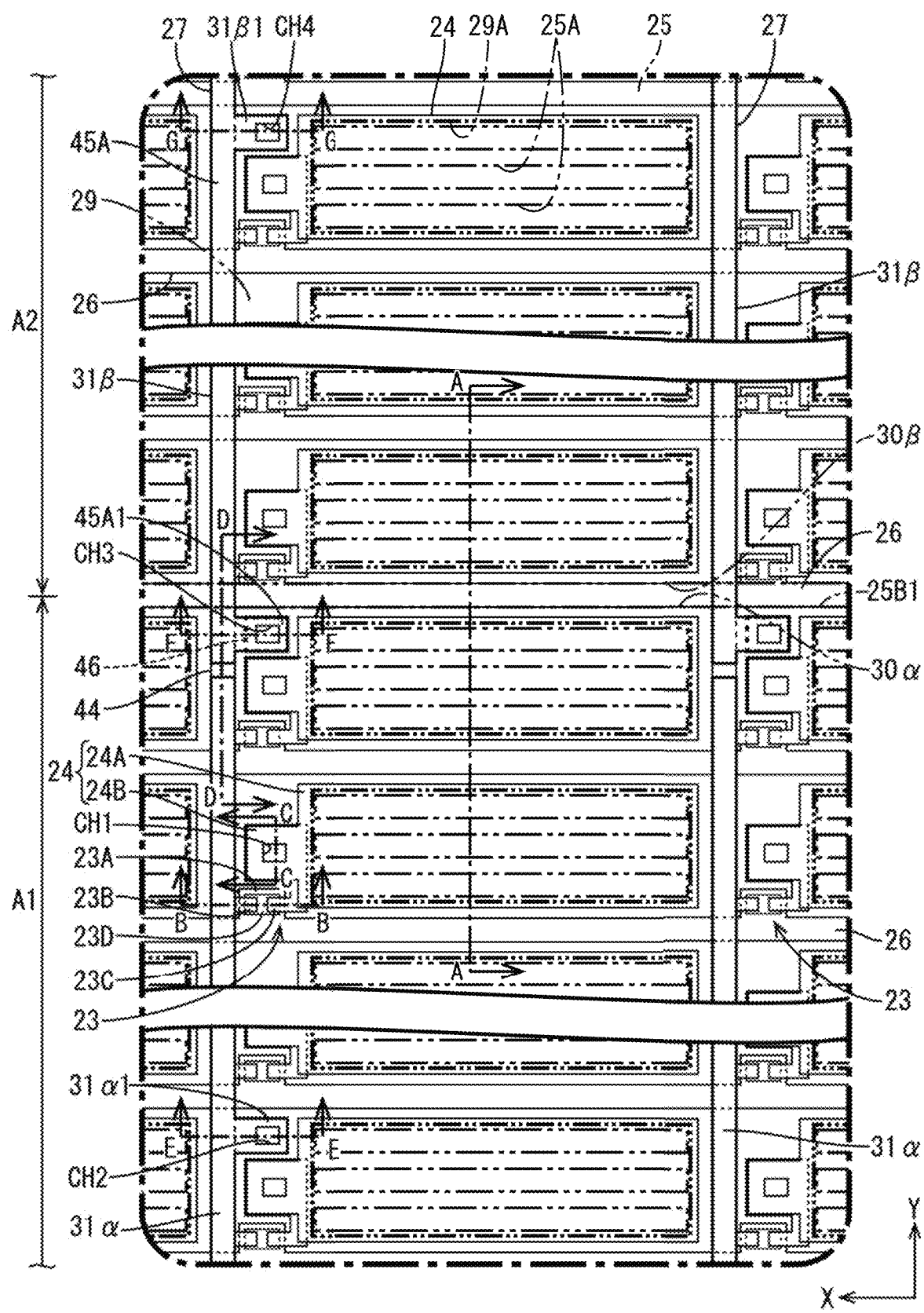
FIG. 2 is a plan view showing a pixel array of the liquid crystal panel.

FIG. 2 is a plan view of the array substrate 21 and the CF substrate 20, which constitute the liquid crystal panel 11, in the display area AA and, particularly, a plane view including the vicinity of a boundary between the first area A1 and the second area A2. As shown in FIG. 2, a TFT (switching element, thin-film transistor) 23 and a pixel electrode 24 are provided at the side of an inner surface of the array substrate 21, which constitutes the liquid crystal panel 11, in the display area AA. A plurality of the TFTs 23 and a plurality of the pixel electrodes 24 are provided in a matrix (rows and columns) by being arranged at spacings along the X-axis direction and the Y-axis direction. Arranged around this TFT 23 and this pixel electrode 24 are a gate line (scanning line) 26 and a source line (pixel line, signal line, data line) 27 that are orthogonal to (cross) each other. While the gate line 26 extends along the X-axis direction (second direction), the source line 27 extends along the Y-axis direction (first direction). While both ends of the gate line 26 are connected to the already-described gate circuit units 14 (see FIG. 1), respectively, one end of the source line 27 is connected to the already-described driver 12 (see FIG. 1). The gate line 26 and the source line 27 are connected to a gate electrode 23A and a source electrode 23B, respectively, of the TFT 23, and the pixel electrode 24 is connected to a drain electrode 23C of the TFT 23. The TFT 23 is driven in accordance with various types of signal that are supplied to the gate line 26 and the source line 27 and, along with this driving, controls the supply of a potential to the pixel electrode 24. Further, the TFT 23 is disposed adjacent to one side (left in FIG. 2) of the pixel electrode 24, to which the TFT 23 is connected, in the X-axis direction.

As shown in FIG. 24, the pixel electrode 24 has a horizontally long longitudinal shape when seen in plan view, has its longitudinal direction corresponding to the X-axis direction (i.e. a direction of extension of the gate line 26), and has its lateral direction corresponding to the Y-axis direction (i.e. a direction of extension of the source line 27). The ratio of a longitudinal dimension to a lateral dimension of the pixel electrode 24 is 3. While the gate line 26 is interposed between pixel electrodes 24 that are adjacent to each other in the lateral direction (Y-axis direction), the source line 27 and the like are interposed between pixel electrodes 24 that are adjacent to each other in the longitudinal direction (X-axis direction). The pixel electrode 24 is constituted by a body portion 24A that is substantially rectangular in planar shape and a contact portion 24B that projects from the body portion 24A along the X-axis direction. Gate lines 26 are arrayed at spacings each of which is about equal to the lateral dimension of the pixel electrode 24, and source lines 27 are arrayed at spacings each of which is about equal to the longitudinal dimension of the pixel electrode 24. Accordingly, in comparison with the case of a pixel electrode having a vertically long shape, each of the spacings at which the source lines 27 are arrayed becomes about equal to the ratio (e.g. approximately 3) obtained by dividing the longitudinal dimension by the lateral dimension of the pixel electrode 24, whereby the number of source lines 27 that are installed per unit length in the X-axis direction is reduced, for example, to approximately ⅓. Also, in comparison with the case of a pixel electrode having a vertically long shape, each of the spacings at which the gate lines 26 are arrayed becomes about equal to the ratio (e.g. approximately ⅓) obtained by dividing the lateral dimension by the longitudinal dimension of the pixel electrode 24, whereby the number of gate lines 26 that are installed per unit length in the Y-axis direction increases, for example, approximately threefold. This makes it possible to reduce the number of source lines 27 that are installed, thus reducing the number of image signals that are supplied to the source lines 27. It should be noted that the CF substrate 20 is provided with a black matrix (light shielding unit) 29 illustrated by chain double-dashed lines in FIG. 2. The black matrix 29 is substantially reticular in planar shape so as to separate adjacent pixel electrodes 24 from one another, and has a pixel opening 29A in a position that overlaps a large portion of a pixel electrode 24 when seen in plan view. This pixel opening 29A allows light transmitted by the pixel electrode 24 to exit out of the liquid crystal panel 11. The black matrix 29 is disposed to, when seen in plan view, overlap at least the TFT 23, the gate line 26, and the source line 27 (as well as the touch line 31), with which the array substrate 21 is provided.

A configuration of the TFT 23 is described in detail. As shown in FIG. 2, the TFT 23 has a gate electrode 23A branching off from the gate line 26. The gate electrode 23A is disposed adjacent to a portion of the gate line 26 that crosses the source line 27, and projects toward the pixel electrode 24, to which the TFT 23 is connected, along the Y-axis direction to form a horizontally long square shape when seen in plan view. The gate electrode 23A is supplied with a scanning signal that is transmitted to the gate line 26. The TFT 23 has a source electrode 23B branching off from the source line 27. The source electrode 23B is disposed adjacent to a portion that crosses the gate line 26, and projects toward the pixel electrode 24, to which the TFT 23 is connected, along the X-axis direction to overlap the gate electrode 23A. The TFT 23 has a drain electrode 23C disposed in a position at a spacing from the source electrode 23B. The drain electrode 23C is bent in a turnover shape when seen in plan view. One end of the drain electrode 23C is opposed to the source electrode 23B, and the other end of the drain electrode 23C is widened and disposed to overlap the contact portion 24B of the pixel electrode 24. The contact portion 24B of the pixel electrode 24 is disposed at a spacing from a gate line 26 on a side opposite (up in FIG. 2) to the TFT 23 in the Y-axis direction. The TFT 23 has a channel portion 23D overlapping the gate electrode 23A and connected to the source electrode 23B and the drain electrode 23C. The channel portion 23D has a horizontally long square shape that is a size smaller than the gate electrode 23A. One end of the channel portion 23D is connected to the source electrode 23B, and the other end of the channel portion 23D is connected to the drain electrode 23C. Moreover, when the TFT 23 is brought into an on state in accordance with a scanning signal that is supplied to the gate electrode 23A, an image signal (signal, data signal) that is supplied to the source line 27 is supplied from the source electrode 23B to the drain electrode 23C via the channel portion 23D, so that the pixel electrode 24 is charged.

Figure 3:
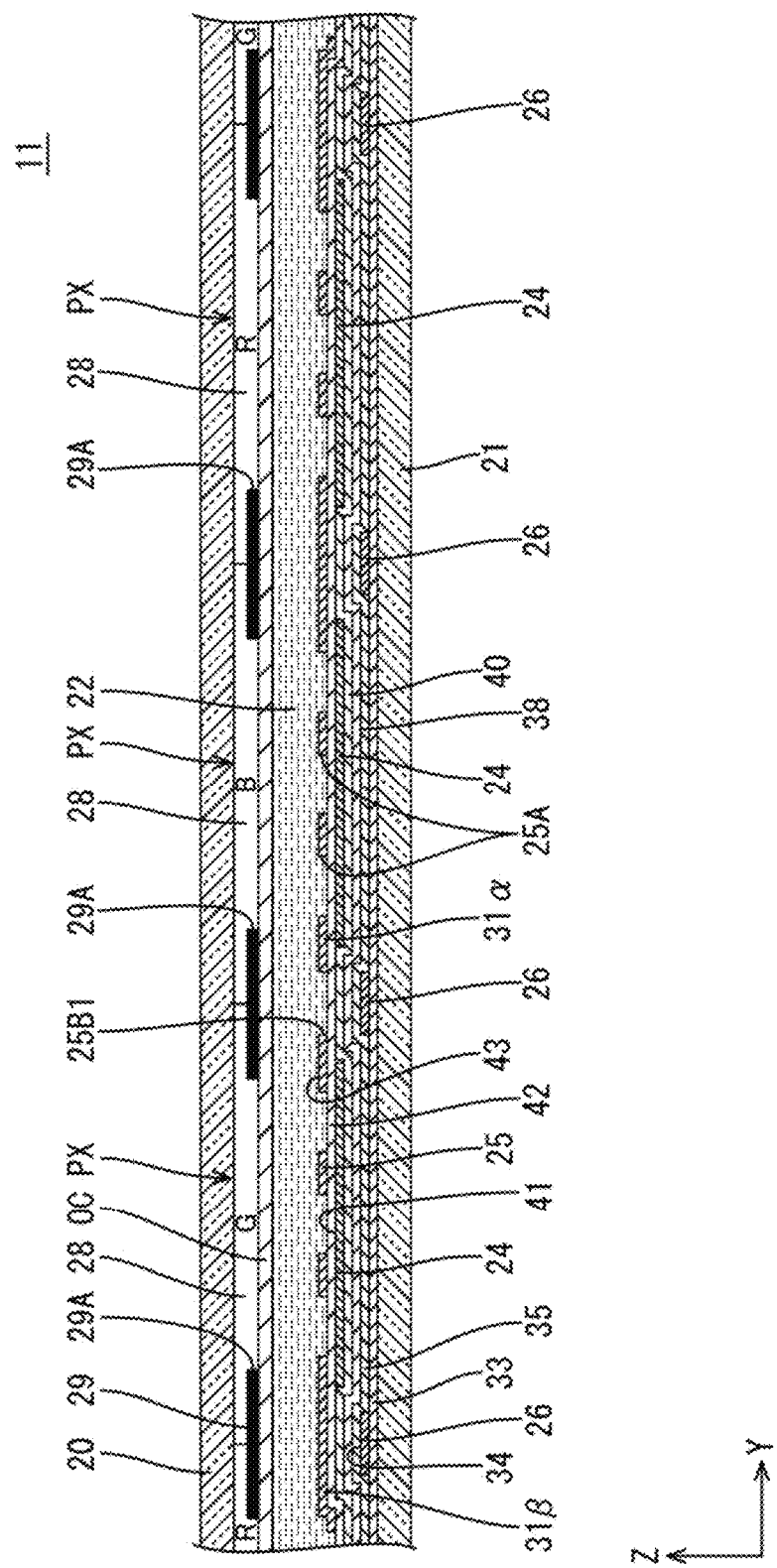
FIG. 3 is a cross-sectional view of the liquid crystal panel as taken along line A-A in FIG. 2.

FIG. 3 is a cross-sectional view of the vicinity of a central part of the pixel PX in the liquid crystal panel 11. As shown in FIG. 3, the liquid crystal panel 11 has a liquid crystal layer (medium layer) 22, placed between the two substrates 20 and 21, that contains liquid crystal molecules constituting a substance whose optical properties vary along with the application of an electric field. In the display area AA at the side of an inner surface of the CF substrate 20, which constitutes the liquid crystal panel 11, a three-color color filter 28 is provided that exhibits blue (B), green (G), and red (R). A plurality of the color filters 28 are arrayed side by side in a matrix in the X-axis direction and the Y-axis direction so as to overlap the pixel electrodes 24, with which the array substrate 21 is provided, when seen in plan view. Color filters 28 that exhibit different colors from one another are repeatedly arranged along the direction of extension of the source line 27 (i.e. the Y-axis direction), and color filters 28 that exhibit the same color are arranged in a row along the direction of extension of the gate line 26 (i.e. the X-axis direction). In this liquid crystal panel 11, R, G, and B color filters 28 arranged along the Y-axis direction and three pixel electrodes 24 each opposed to a corresponding one of the color filters 28 constitute pixels PX of three colors, respectively. Moreover, in this liquid crystal panel 11, a display pixel that is capable of a color display of a predetermined tone is constituted by pixels PX of three colors, namely R, G, and B, that are adjacent to one another along the Y-axis direction. Pitches at which the pixels PX are arrayed in the X-axis direction are approximately three times larger than pitches at which they are arrayed in the Y-axis direction. The black matrix 29 is placed in such a manner as to separate color filters 28 opposed to adjacent pixel electrodes 24 from one another. Provided at a higher layer than the color filter 28 (that faces the liquid crystal layer 22) is a planarizing film OC solidly placed substantially all over the CF substrate 20. It should be noted that alignment films for aligning the liquid crystal molecules contained in the liquid crystal layer 22 are formed on the innermost surfaces of the substrates 20 and 21 that make contact with the liquid crystal layer 22, respectively.

Figure 4:
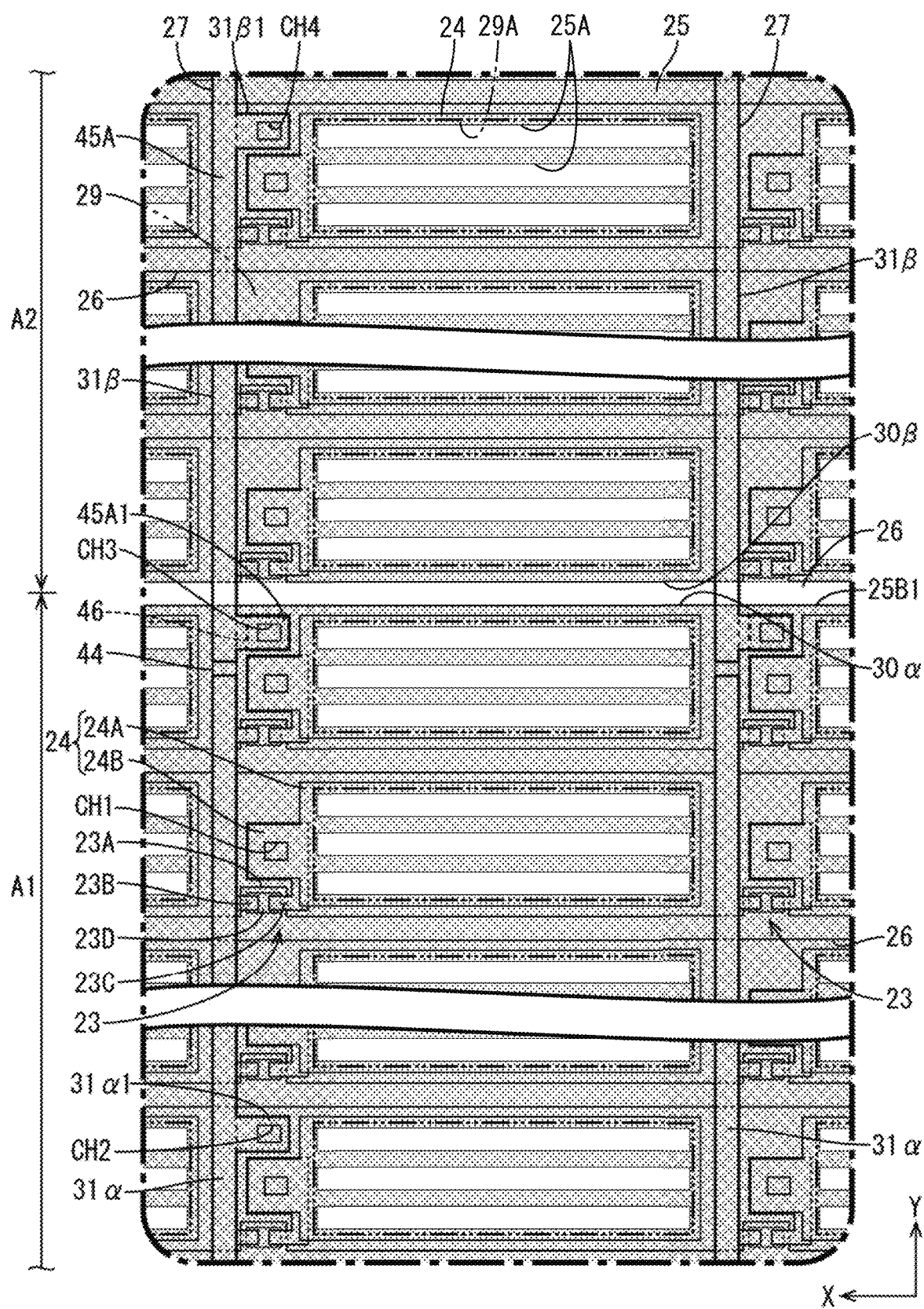
FIG. 4 is a plan view showing a pattern of a second transparent electrode film with which an array substrate constituting the liquid crystal panel is provided.

In the following, a common electrode 25 is described with reference to FIGS. 2 to 4. FIG. 4 is a plan view showing a pattern of a common electrode 25 (i.e. the after-mentioned second transparent electrode film 43) with which the array substrate 21 is provided in FIG. 2. FIG. 4 illustrates the second transparent electrode film 43 by half-tone dot meshing. At the side of the inner surface of the array substrate 21 in the display area AA, as shown in FIGS. 2 to 4, the common electrode 25 is formed at a higher layer than the pixel electrode 24 in such a manner as to overlap all of the pixel electrodes 24. The common electrode 25 is always supplied with a substantially constant reference potential except for a period of time (sensing period) during which a touch signal (position detection signal) is supplied and an input position inputted by a finger serving as a position input body is detected, and extends substantially all over the display area AA. The common electrode 25 has a plurality of pixel overlap openings (pixel overlap slits, alignment control slits) 25A, bored through portions of the common electrode 25 that separately overlap each pixel electrode 24, that separately extend along the longitudinal direction of each pixel electrode 24. It should be noted that the specific number of pixel overlap openings 25A, the specific shapes of the pixel overlap opening 25A, and the specific range of formation of the pixel overlap openings 25, and the like are subject to appropriate change other than those illustrated. At the generation of a potential difference between the common electrode 25 and the pixel electrode 24, which overlap each other, along with charging of the pixel electrode 24, a fringe field (oblique field) containing a component normal to a board surface of the array substrate 21 in addition to a component parallel to the board surface of the array substrate 21 is generated between an opening edge of the pixel overlap opening 25A and the pixel electrode 24. Accordingly, this fringe field can be utilized to control a state of alignment of the liquid crystal molecules contained in the liquid crystal layer 22, and a predetermined display is done on the basis of this state of alignment of the liquid crystal molecules. That is, the liquid crystal panel 11 according to the present embodiment operates in an FFS mode (fringe field switching) mode.

Moreover, as shown in FIGS. 1 and 4, this common electrode 25 constitutes the already-described touch electrodes 30. In addition to the already-described pixel overlap openings 25A, the common electrode 25 has a partition opening (inter-position-detecting-electrode opening) 25B that separates adjacent touch pixels 30 from one another. The partition opening 25B is composed of a first opening 25B1 that laterally extends over the entire length of the common electrode 25 along the X-axis direction and separates touch electrode 30 that are adjacent to one another in the Y-axis direction and a second opening 25B2 that longitudinally extends over the entire length of the common electrode 25 along the Y-axis direction and separates touch electrodes 30 that are adjacent to one another in the X-axis direction, and has a substantially reticular shape as a whole when seen in plan view. The first opening 25B1 is placed so as to overlap those of a plurality of the gate lines 26 which are interposed between the touch electrodes 30 that are adjacent to one another in the Y-axis direction. The second opening 25B2 is placed so as to overlap those of a plurality of the source lines 27 which are interposed between the touch electrodes 30 that are adjacent to one another in the X-axis direction. The common electrode 25 is composed of a plurality of the touch electrodes 30 that are electrically independent of one another by being divided by such a partition opening 25B into a grid pattern when seen in plan view. Accordingly, the touch line 31 connected to a touch electrode 30 supplies a common signal (reference potential signal) related to the display function and a touch signal related to the touch panel function to the touch electrode 30 at different timings (in a time-sharing manner). Of these signals, the common signal is transmitted to all of the touch lines 31 at the same timing, whereby all of the touch electrodes 30 are brought to the reference potential to function as the common electrode 25.

Figure 5:
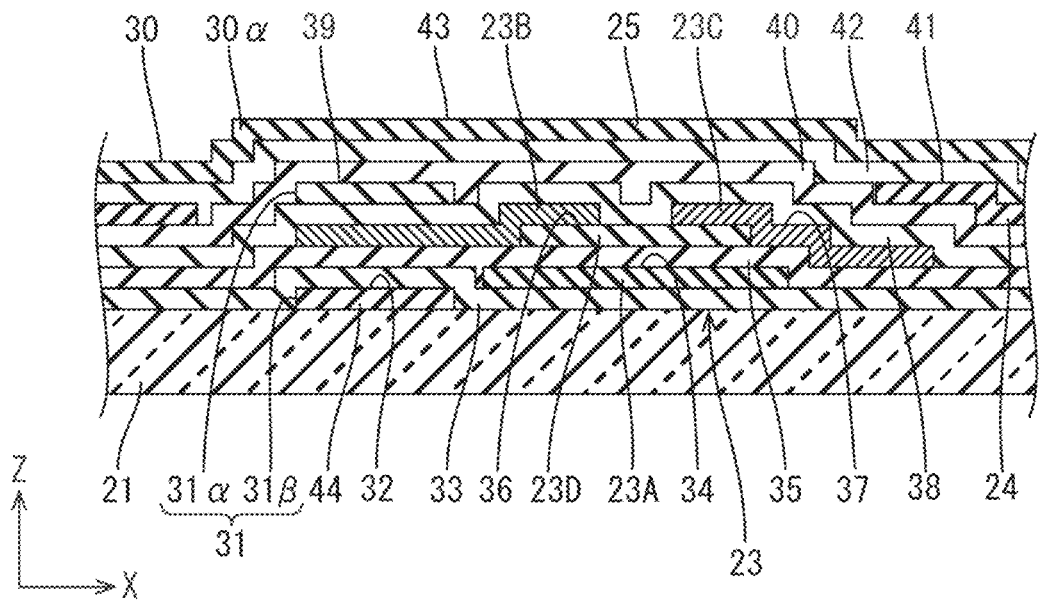
FIG. 5 is a cross-sectional view of the array substrate as taken along line B-B in FIG. 2.
Figure 6:
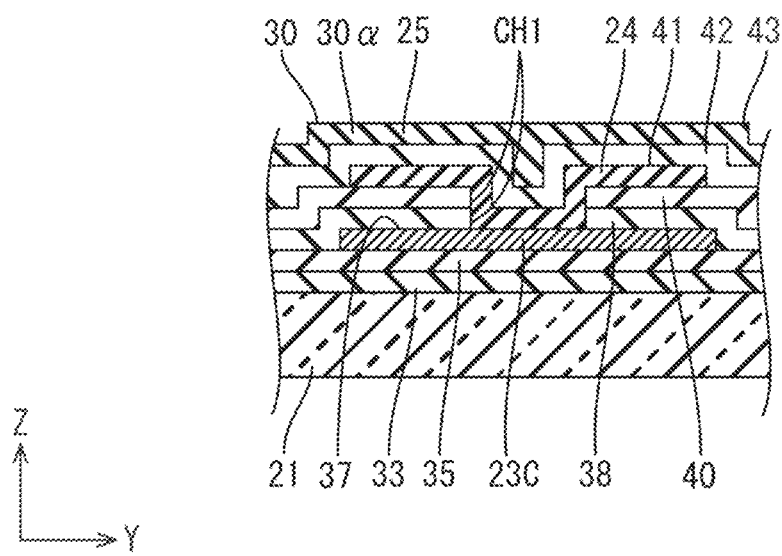
FIG. 6 is a cross-sectional view of the array substrate as taken along line C-C in FIG. 2.

Various types of film stacked at the side of the inner surface of the array substrate 21 are described with reference to FIGS. 5 and 6. FIGS. 5 and 6 are each a cross-sectional view of the vicinity of a TFT 23 on the array substrate 21. At the array substrate 21, as shown in FIGS. 5 and 6, a first metal film (lower conducting film) 32, a lower insulating film (insulating film) 33, a second metal film 34, a gate insulating film (insulating film) 35, a semiconductor film 36, a third metal film (intermediate conducting film) 37, a first interlayer insulating film (insulating film) 38, a fourth metal film (upper conducting film) 39, a second interlayer insulating film (insulating film) 40, a first transparent electrode film 41, an inter-electrode insulating film (insulating film) 42, and a second transparent electrode film 43 are stacked in this order from a lower layer side (glass substrate side). The first metal film 32, the second metal film 34, the third metal film 37, and the fourth metal film 39 each have electric conductivity and a light blocking effect by being a single-layer film composed of one type of metal material selected from among copper, titanium, aluminum, molybdenum, and tungsten or a laminated film or alloy composed of different types of metal material. The second metal film 34 constitutes the gate line 26, the gate electrode 23A of the TFT 23, and the like. The third metal film 37 constitutes the source line 27, the source electrode 23B and drain electrode 23C of the TFT 23, and the like. The first metal film 32 and the fourth metal film 39 constitute the touch line 31 and the like. The semiconductor film 36 is composed of a thin film made, for example, of a semiconductor material such as an oxide semiconductor or amorphous silicon, and constitutes the channel portion 23D and the like in the TFT 23. The first transparent electrode film 41 and the second transparent electrode film 43 are composed of a transparent electrode material (such as ITO (indium tin oxide) or IZO (indium zinc oxide)). The first transparent electrode film 41 constitutes the pixel electrode 24 and the like. The second transparent electrode film 43 constitutes the common electrode 25 (touch electrode 30) and the like.

The lower insulating film 33, the gate insulating film 35, the first interlayer insulating film 38, the second interlayer insulating film 40, and the inter-electrode insulating film 42 are each composed of an inorganic material such as silicon nitride ($SiN_x$) or silicon oxide ($SiO_2$). The lower insulating film 33 keeps the first metal film 32, which is at a lower layer than the lower insulating film 33, and the second metal film 34, which is at a higher layer than the lower insulating film 33, insulated from each other. The gate insulating film 35 keeps the second metal film 34, which is at a lower layer than the gate insulating film 35, and the semiconductor film 36 and the third metal film 37, which are at a higher layer than the gate insulating film 35, insulated from each other. The first interlayer insulating film 38 keeps the semiconductor film 36 and the third metal film 37, which are at a lower layer than the first interlayer insulating film 38, and the fourth metal film 39, which is at a higher layer than the first interlayer insulating film 38, insulated from each other. The second interlayer insulating film 40 keeps the fourth metal film 39, which is at a lower layer than the second interlayer insulating film 40, and the first transparent electrode film 41, which is at a higher layer than the second interlayer insulating film 40, insulated from each other. As shown in FIG. 6, the first interlayer insulating film 38 and the second interlayer insulating film 40 have a contact hole CH1, bored through portions of the first interlayer insulating film 38 and the second interlayer insulating film 40 that overlap both the drain electrode 23C and the contact portion 24B of the pixel electrode 24, through which the drain electrode 23C and the pixel electrode 24 are connected to each other. The inter-electrode insulating film 42 keeps the first transparent electrode film 41, which is at a lower layer than the inter-electrode insulating film 42, and the second transparent electrode film 43, which is at a higher layer than the inter-electrode insulating film 42, insulated from each other.

Note here that as shown in FIGS. 1 and 2, the plurality of touch electrodes 30 according to the present embodiment include a plurality of first touch electrodes (first position detecting electrodes) 30α placed in the first area A1, which is located beside the driver 12 in the Y-axis direction, of the display area AA and a plurality of second touch electrodes (second position detecting electrodes) 30β placed in the second area A2 of the display area AA located on a side opposite to the driver 12 in the Y-axis direction. The numbers of first touch electrodes 30α and second touch electrodes 30β that are installed are substantially equal to each other. On the other hand, the plurality of touch lines 31 include a plurality of first touch lines (first position detecting lines) 31α connected to the driver 12 and the first touch electrodes 30α and a plurality of second touch lines (second position detecting lines) 31β connected to the driver 12 and the second touch electrodes 30β. Of these, a large portion of each of the first touch lines 31α is placed in the first area A1 in which the first touch electrodes 30α, to which the first touch lines 31α are connected, are located, and a part (i.e. one end) of each of the first touch lines 31α is drawn out from the first area A1 toward the driver 12. On the other hand, a large portion of each of the second touch lines 31β is placed in such a manner as to lie astride the second area A2 in which the second touch electrodes 30β, to which the second touch lines 31β are connected, are located and the first area A1 interposed between the second area A2 and the driver 12, and a part (i.e. one end) of each of the second touch lines 31β is drawn out from the first area A1 toward the driver 12.

Moreover, as shown in FIGS. 1 and 2, the first touch lines 31α and the second touch lines 31β are both placed so as to extend parallel to the source lines 27 and overlap the source lines 27. This makes it possible to ensure more first touch lines 31α and second touch lines 31β than in a case where the display area AA is not divided and one type of touch line is connected to a touch electrode, and is suitable for a case where the numbers of first touch electrodes 30α and second touch electrodes 30β that are installed are large. Increasing the numbers of first touch electrodes 30α and second touch electrodes 30β that are installed can bring about improvement in touch detection accuracy. Moreover, since the first touch lines 31α, which are placed in the first area A1, and the second touch lines 31β, which are placed in such a manner as to lie astride the first area A1 and the second area A2, are both placed so as to overlap the source lines 27, an aperture ratio of the pixel PX can be kept high in the first area A1 and the second area A2.

Figure 7:
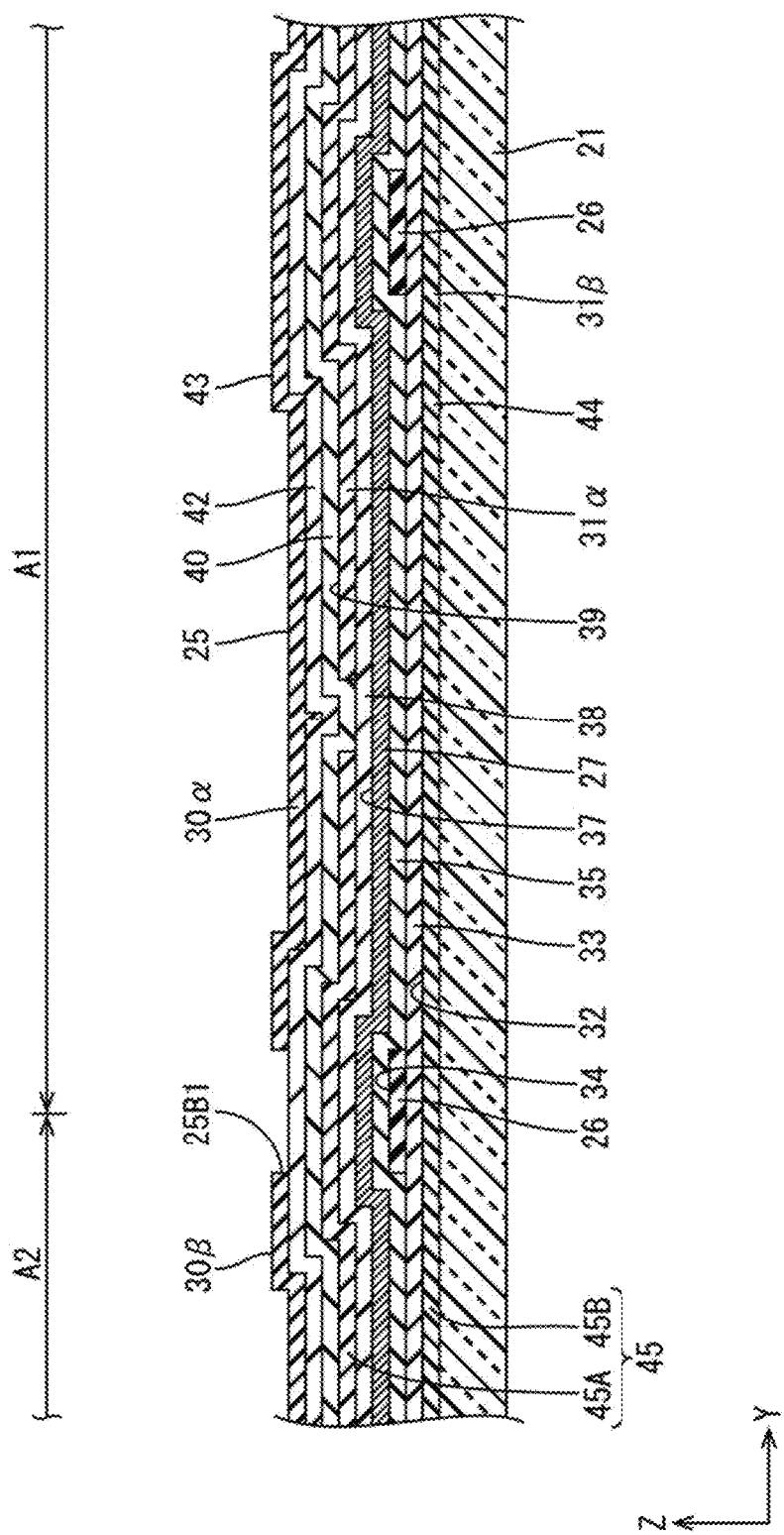
FIG. 7 is a cross-sectional view of the array substrate as taken along line D-D in FIG. 2.

FIG. 7 is a cross-sectional view of a first touch line 31α and a second touch line 31β over the array substrate 21. As shown in FIG. 7, the first touch line 31α and the second touch line 31β are placed at different layers than the third metal film 37, which constitutes a source line 27 that the first touch line 31α and the second touch line 31β overlap. Specifically, the first touch line 31α is composed of the fourth metal film 39. Accordingly, the first touch line 31α is disposed at a higher layer than the source line 27 to overlap the source line 27 via the first interlayer insulating film 38. The second touch line 31β is composed of a portion composed of the first metal film 32 (i.e. the after-mentioned first area side second touch line constituting portion 44 and the after-mentioned second touch electrode connected portion 45A) and a portion composed of the fourth metal film 39 (i.e. the after-mentioned second touch electrode unconnected portion 45B). Accordingly, the portion of the second touch line 31β composed of the first metal film 32 is disposed at a lower layer than the source line 27 to overlap the source line 27 via the lower insulating film 33 and the gate insulating film 35, and the portion of the second touch line 31β composed of the fourth metal film 39 is disposed at a higher layer than the source line 27 to overlap the source line 27 via the first interlayer insulating film 38. It should be noted that FIG. 1 uses thin solid lines to illustrate those portions of the first touch lines 31α and the second touch lines 31β composed of the first metal film 32 and uses thick solid lines to illustrate those portions of the first touch lines 31α and the second touch lines 31β composed of the fourth metal film 39.

Figure 8:
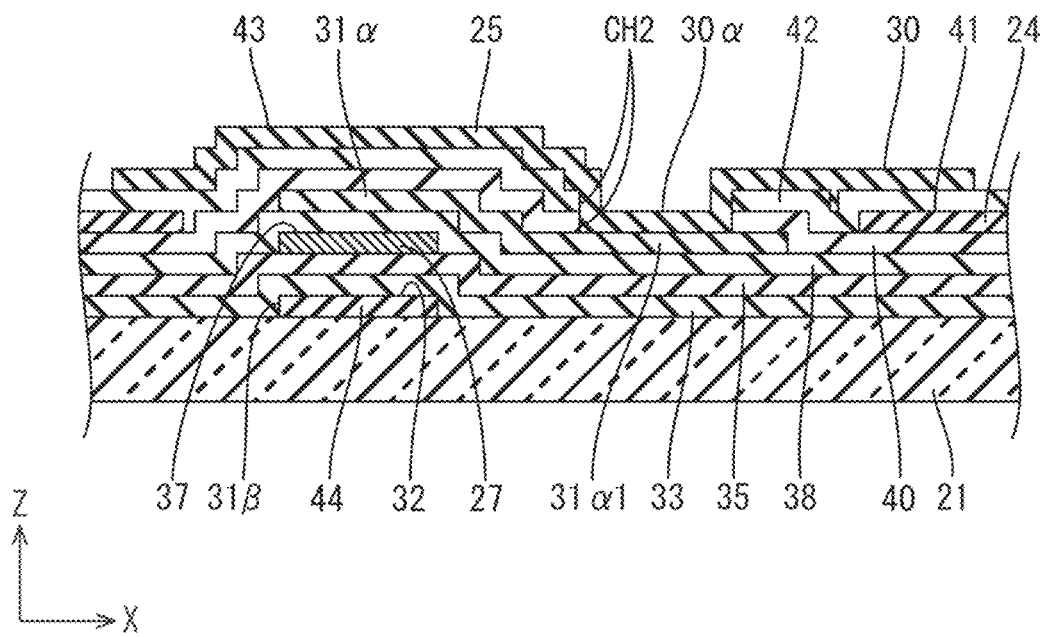
FIG. 8 is a cross-sectional view of the array substrate as taken along line E-E in FIG. 2.

A connection structure between a first touch line 31α and a first touch electrode 30α is described with reference to FIG. 8 in addition to FIG. 2. FIG. 8 is a cross-sectional view of the vicinity of a connection point between a first touch line 31α and a first touch electrode 30α over the array substrate 21. As shown in FIG. 2, the first touch line 31α has a first connected portion 31α1 placed so as to overlap the first touch electrode 30α, to which the first touch line 31α is connected, and connected to the first touch electrode 30α. The first connected portion 31α1 is formed in such a manner as to laterally project along the X-axis direction from the first touch line 31α, and has a square shape when seen in plan view. The first connected portion 31α1 is placed so as not to overlap the TFT 23, the gate line 26, the source line 27, the second touch line 31β, or the pixel electrode 24. Moreover, as shown in FIGS. 2 and 8, the first touch line 31α, which is composed of the fourth metal film 39, has its first connected portion 31α1 connected to the first touch electrode 30α, which is composed of the second transparent electrode film 43, through a first touch electrode contact hole CH2 continuously bored through the second interlayer insulating film 40 and the inter-electrode insulating film 42, which are sandwiched between the first touch line 31α and the first touch electrode 30α.

As shown in FIG. 7, the second touch line 31β is constituted by a first area side second touch line constituting portion (first area side second position detecting line constituting portion) 44 placed in the first area A1 and a second area side second touch line constituting portion (second area side second position detecting line constituting portion) 45 placed in the second area A2. The first area side second touch line constituting portion 44 is composed of the first metal film 32, and is disposed at a lower layer than the source line 27 to overlap the source line 27 via the lower insulating film 33 and the gate insulating film 35. For this reason, it can be said that the source line 27, which is composed of the third metal film 37, is located midway between the first touch line 31α, which is composed of the fourth metal film 39 in the first area A1, and the first area side second touch line constituting portion 44, which constitutes the second touch line 31β and is composed of the first metal film 32. Accordingly, in comparison with a case where a source line is composed of either the first metal film 32 or the fourth metal film 39, i.e. a case where the source line 27 is not located midway between the first touch line 31α and the first area side second touch line constituting portion 44, a parasitic capacitance that is formed between the first touch line 31α and the second touch line 31β can be made smaller, so that sensitivity related to touch detection (position detection) can be kept high.

As shown in FIG. 7, the second area side second touch line constituting portion 45 has a second touch electrode connected portion (second position detecting electrode connected portion) 45A composed of the fourth metal film 39 and connected to the second touch electrode 30β. This second touch electrode connected portion 45A has a portion extended toward the first area A1, and the extended portion is connected to the first area side second touch line constituting portion 44. That is, a signal outputted from the driver 12 is supplied to the second touch electrode 30β after having been transmitted to the second touch electrode connected portion 45A, which is composed of the fourth metal film 39, via the first area side second touch line constituting portion 44, which is composed of the first metal film 32. The second touch electrode connected portion 45A extends along the Y-axis direction, and is disposed at a higher layer than the source line 27 to overlap the source line 27 via the first interlayer insulating film 38.

Figure 9:
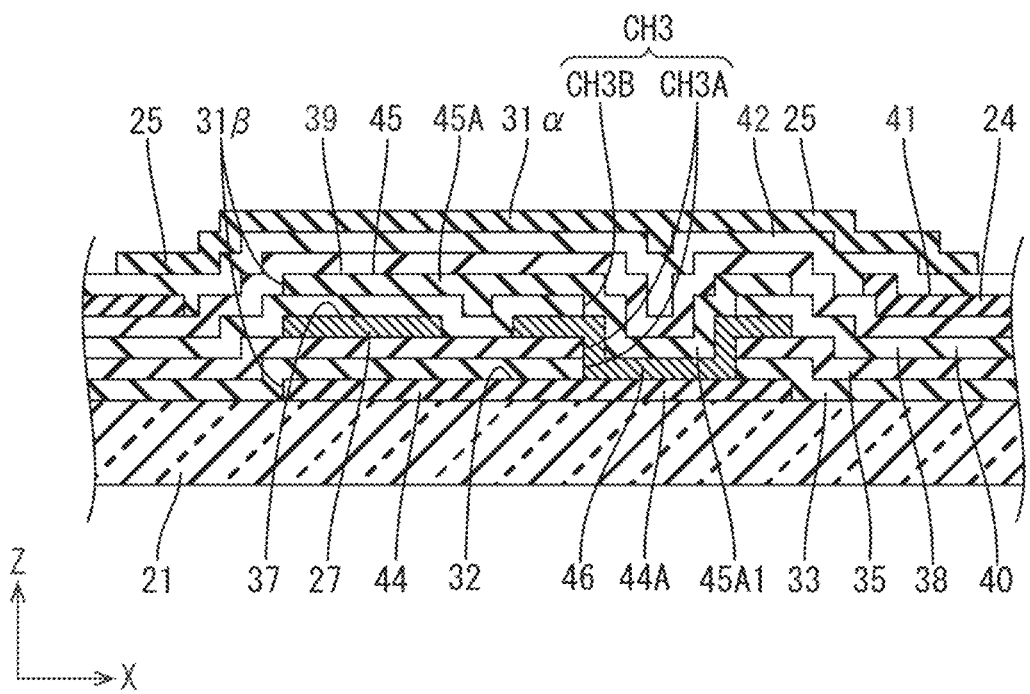
FIG. 9 is a cross-sectional view of the array substrate as taken along line F-F in FIG. 2.

In the following, a relay connection structure between a first area side second touch line constituting portion 44 and a second touch electrode connected portion 45A is described with reference to FIG. 9 in addition to FIG. 2. FIG. 9 is a cross-sectional view of the vicinity of a relay connection point of a second touch line 31β over the array substrate 21. As shown in FIG. 2, the first area side second touch line constituting portion 44 has a first relay connected portion 44A laterally projecting along the X-axis direction and having a square shape when seen in plan view. The first relay connected portion 44A concatenated to the vicinity of an end of the first area side second touch line constituting portion 44 that faces away from the driver 12, and is located near a boundary of the first area A1 with the second area A2. More specifically, the first relay connected portion 44A is disposed adjacent to the first opening 25B1, which is located at the boundary between the first area A1 and the second area A2, of the partition opening 25B, which separates adjacent touch electrodes 30 from one another, and to a gate line 26 overlapping the first opening 25B1. The first relay connected portion 44A is placed so as not to overlap the TFT 23, the gate line 26, the source line 27, the first touch line 31α, or the pixel electrode 24. It should be noted that the planar disposition of the first relay connected portion 44A with respect to the TFT 23, the gate line 26, the source line 27, the first touch line 31α, and the pixel electrode 24 is substantially the same as the planar disposition of the first connected portion 31α1 with respect to the TFT 23, the gate line 26, the source line 27, the second touch line 31β, and the pixel electrode 24.

Meanwhile, as shown in FIG. 2, an end of the second touch electrode connected portion 45A, which is placed in the second area A2, that faces toward the driver 12 is extended toward the first area A1, and the extended end is provided with a second relay connected portion 45A1 laterally projecting along the X-axis direction and having a square shape when seen in plan view. The second relay connected portion 45A1 does not overlap the TFT 23, the gate line 26, the source line 27, the first touch line 31α, or the pixel electrode 24, but is placed so as to overlap the first relay connected portion 44A. It should be noted that the position of an end of the first touch line 31α that faces away from the driver 12 is adjusted so that the first touch line 31α does not overlap the extended portion of the second touch electrode connected portion 45A. As shown in FIG. 9, the first relay connected portion 44A and the second relay connected portion 45A1, which overlap each other, are connected to each other through a relay contact hole CH3 bored through the lower insulating film 33, the gate insulating film 35, and the first interlayer insulating film 38, which are sandwiched between the first relay connected portion 44A and the second relay connected portion 45A1. In particular, an intermediate electrode 46 composed of the third metal film 37 is sandwiched between the first relay connected portion 44A, which is composed of the first metal film 32, and the second relay connected portion 45A1, which is composed of the fourth metal film 39, and a connection between the first relay connected portion 44A and the second relay connected portion 45A1 is achieved via this intermediate electrode 46. The intermediate electrode 46 has a square shape when seen in plan view, is placed so as to overlap both the first relay connected portion 44A and the second relay connected portion 45A1, and is placed at a spacing from the source line 27, which is composed of the same third metal film 37, in the X-axis direction. Accordingly, the relay contact hole CH3 includes a first relay contact hole CH3A bored through the lower insulating film 33 and the gate insulating film 35, which are sandwiched between the intermediate electrode 46 and the first area side second line constituting portion 44, and a second relay contact hole CH3B bored through the first interlayer insulating film 38, which is sandwiched between the intermediate electrode 46 and the second touch electrode connected portion 45A. Therefore, a signal that is outputted from the driver 12 and transmitted by the first area side second touch line constituting portion 44 is transmitted to the second touch electrode connected portion 45A through the second contact hole CH3B after having been transmitted to the intermediate electrode 46 through the first relay contact hole CH3A. Thus, in comparison with a case where a first area side line constituting portion and an electrode connected portion are directly connected to each other, the intermediate electrode 46 alleviates the difference in level in the second touch electrode connected portion 45A, which is composed of the fourth metal film 39. This gives high connection reliability and is suitable to bringing about improvement in yield.

As shown in FIG. 2, the black matrix 29, with which the CF substrate 20 is provided, is disposed to overlap the first relay connected portion 44A, the second relay connected portion 45A1, and the intermediate electrode 46, which serve as a relay connection structure for the second touch line 31β. In this way, the black matrix 29 makes it hard for a user of the liquid crystal display device 10 to visually recognize display unevenness attributed to the relay contact hole CH3, which is provided in each of the insulating films 33, 35, and 38 over the array substrate 21 in order to connect the first relay connected portion 44A, the second relay connected portion 45A1, and the intermediate electrode 46 to one another. This gives superior display quality.

Figure 10:
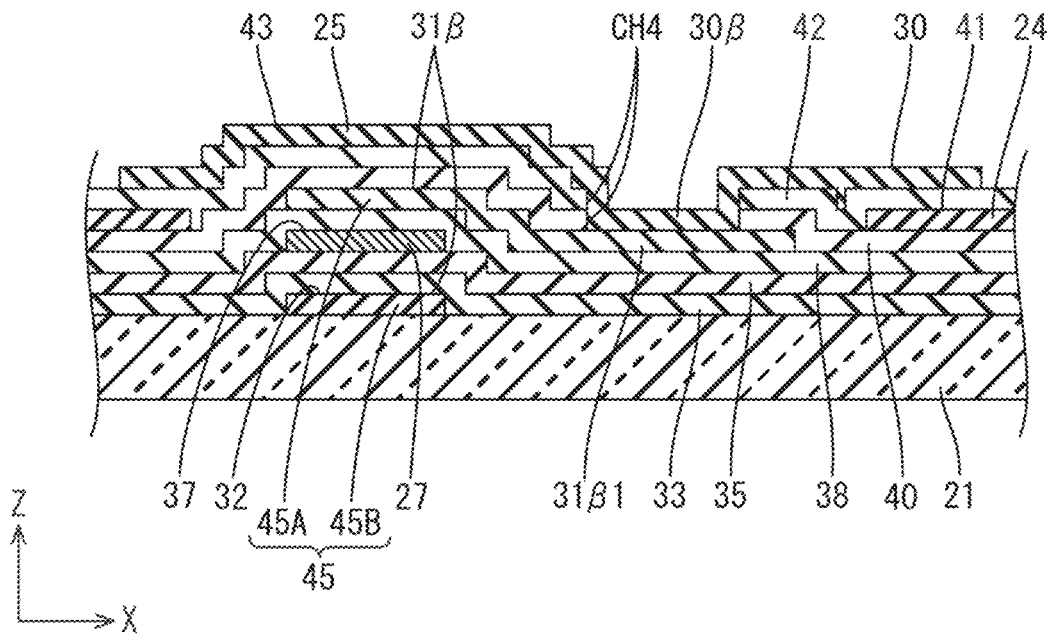
FIG. 10 is a cross-sectional view of the array substrate as taken along line G-G in FIG. 2.

A connection structure between a second touch line 31β and a second touch electrode 30β is described with reference to FIG. 10 in addition to FIG. 2. FIG. 10 is a cross-sectional view of the vicinity of a connection point between a second touch line 31β and a second touch electrode 30β over the array substrate 21. As shown in FIG. 2, the second touch line 31β is constituted by a second area side second touch line constituting portion 45 whose second touch electrode connected portion 45A has a second connected portion 31β1 placed so as to overlap the second touch electrode 30β, to which the second touch electrode connected portion 45A is connected, and connected to the second touch electrode 30β. The second connected portion 31β1 is formed in such a manner as to laterally project along the X-axis direction from the second touch electrode connected portion 45A, and has a square shape when seen in plan view. The second connected portion 31β1 is placed so as not to overlap the TFT 23, the gate line 26, the source line 27, or the pixel electrode 24. It should be noted that the planar disposition of the second connected portion 31β1 with respect to the TFT 23, the gate line 26, the source line 27, and the pixel electrode 24 is substantially the same as the planar disposition of the first relay connected portion 44A with respect to the TFT 23, the gate line 26, the source line 27, the first touch line 31α, and the pixel electrode 24 and the planar disposition of the first connected portion 31α1 with respect to the TFT 23, the gate line 26, the source line 27, the second touch line 31β, and the pixel electrode 24. Moreover, as shown in FIGS. 2 and 10, the second touch electrode connected portion 45A, which is composed of the fourth metal film 39, has its second connected portion 31β1 connected to the second touch electrode 30β, which is composed of the second transparent electrode film 43, through a second touch electrode contact hole CH4 continuously bored through the second interlayer insulating film 40 and the inter-electrode insulating film 42, which are sandwiched between the second touch electrode connected portion 45A and the second touch electrode 30β. Thus, the second touch electrode connected portion 45A, which is connected to the second touch electrode 30β, is composed of the same fourth metal film 39 as the first touch line 31α, which is connected to the first touch electrode 30α. Accordingly, there is commonality between the connection structure of the second touch electrode connected portion 45A with respect to the second touch electrode 30β and the connection stricture of the first touch line 31α with respect to the first touch electrode 30α. This makes it easy to make a design for ensuring the connection reliability of each of the touch lines 31α and 31β with respect to a corresponding one of the touch electrodes 30α and 30β.

As shown in FIG. 7, the second area side second touch line constituting portion 45, which constitutes the second touch line 31β, has, in addition to the second touch electrode connected portion 45A described above, a second touch electrode unconnected portion (second position detecting electrode unconnected portion) 45B that is not directly connected to the second touch electrode 30β. That is, the second area side second touch line constituting portion 45 has a laminated structure composed of the second touch electrode connected portion 45A and the second touch electrode unconnected portion 45B. The second touch electrode unconnected portion 45B is composed of the first metal film 32, extends along the Y-axis direction, and is disposed at a lower layer than the source line 27 to overlap the source line 27 via the lower insulating film 33 and the gate insulating film 35. The second touch electrode unconnected portion 45B is disposed at a lower layer than the second touch electrode connected portion 45A to overlap the second touch electrode connected portion 45A via the lower insulating film 33, the gate insulating film 35, the source line 27, and the first interlayer insulating film 38. Moreover, an end of the second touch electrode unconnected portion 45B that faces toward the driver 12 is concatenated to an end of the first area side second touch line constituting portion 44, which is composed of the same first metal film 32, that faces away from the driver 12. Accordingly, the second touch electrode unconnected portion 45B is not directly connected to the second touch electrode connected portion 45A, which the second touch electrode unconnected portion 45B overlaps, but is at the same potential as the second touch electrode connected portion 45A. That is, a signal that is supplied to the first area side second touch line constituting portion 44 is supplied to both the second touch electrode connected portion 45A and the second touch electrode unconnected portion 45B. The second touch electrode unconnected portion 45B and the first area side second touch line constituting portion 44, which are concatenated to each other, are placed so as to overlap the source line 27 over substantially the entire length of the source line 27 in the first area A1 and the second area A2. For this reason, while the source line 27 is located midway between the first touch line 31α and the first area side second touch line constituting portion 44 of the second touch line 31β in the first area A1, the source line 27 is located midway between the second touch electrode connected portion 45A and the second touch electrode unconnected portion 45B of the second area side second touch line constituting portion 45 of the second touch line 31β in the second area A2. Accordingly, in comparison with a case where the second touch electrode unconnected portion 45B is not installed, the first area A1 and the second area A2 can be made equal in parasitic capacitance that is formed between the source line 27 and the pixel electrode 24. This makes it hard for a luminance difference to appear between the first area A1 and the second area A2 in an image that is displayed in the display area AA, giving superior display quality. It should be noted that the name "second touch electrode unconnected portion 45B" is given to be distinguished from the second touch electrode connected portion 45A on the basis of whether it is directly connected to the second touch electrode 30β, and is not intended to mean that it is "not electrically continuous with the second touch electrode 30β". In the present embodiment, the second touch electrode unconnected portion 45B is electrically continuous with the second touch electrode 30β via the first area side second touch line constituting portion 44 and the second touch electrode connected portion 45A.

As described above, a liquid crystal display device (display device including a position input function) 10 of the present embodiment includes: a pixel PX; a source line (pixel line) 27 through which to transmit a signal that is supplied to the pixel PX; a driver (signal supply unit) 12, connected to one end of the source line 27, that supplies a signal; a display area AA in which the pixel PX is placed so that an image is displayed and in which the source line 27 is placed to extend so as to pass transversely across the display area AA, the display area AA being divided into a first area A1 located beside the driver 12 in a direction of extension of the source line 27 and a second area A2 located on a side opposite to the driver 12 in the direction of extension; a first touch electrode (first position detecting electrode) 30α, placed in the first area A1, that forms a capacitance with a position input body which performs position input and that detects an input position inputted by the position input body; a second touch electrode (second position detecting electrode) 30β, placed in the second area A2, that forms a capacitance with the position input body and detects the input position; a first touch line (first position detecting line) 31α placed so as to run parallel to the source line 27 and overlap the source line 27 in the first area A1 and connected to the driver 12 and the first touch electrode 30α; and a second touch line (second position detecting line) 31β placed so as to run parallel to the source line 27 and overlap the source line 27 in such a manner as to lie astride the first area A1 and the second area A2 and connected to the driver 12 and the second touch electrode 30β.

In this way, when the pixel PX, which is placed in the display area AA, is charged in accordance with a signal that is supplied via the source line 27 from the driver 12, an image is displayed in the display area AA. The first touch electrode 30α and the second touch electrode 30β form capacitances with the position input body, which performs position input, and can detect, through the use of signals that are supplied via the first touch line 31α and the second touch line 31β from the driver 12, input positions inputted by the input position body, respectively. Moreover, while the first touch electrode 30α is placed in the first area A1, which is located beside the driver 12 in the direction of extension of the source line 27, of the display area AA and is connected to the first touch line 31α, which runs parallel to the source line 27 in the first area A1, the second touch electrode 30β is placed in the second area A2, which is located on the side opposite to the driver 12 in the direction of extension of the source line 27, and is connected to the second touch line 31β, which runs parallel to the source line 27 in such a manner as to lie astride the first area A1 and the second area A2. This makes it possible to ensure more first touch lines 31α and second touch lines 31β than in a case where the display area AA is not divided and one type of touch line is connected to a touch electrode, and is suitable for a case where the numbers of first touch electrodes 30α and second touch electrodes 30β that are installed are large. Increasing the numbers of first touch electrodes 30α and second touch electrodes 30β that are installed can bring about improvement in touch detection accuracy. Moreover, since the first touch line 31α, which is placed in the first area A1, and the second touch line 31β, which is placed in such a manner as to lie astride the first area A1 and the second area A2, are both placed so as to overlap the source line 27, an aperture ratio of the pixel PX can be kept high in the first area A1 and the second area A2.

Further, the liquid crystal display device 10 further includes: a first metal film (lower conducting film) 32; a fourth metal film (upper conducting film) 39 placed at a higher layer than the first metal film 32; and a third metal film (intermediate conducting film) 37 located midway between the first metal film 32 and the fourth metal film 39. The first touch line 31α is composed of one of the first metal film 32 and the fourth metal film 39. The second touch line 31β has a first area side second touch line constituting portion (first area side second position detecting line constituting portion) 44 placed in the first area A1 and composed of the other of the first metal film 32 and the fourth metal film 39. The source line 27 is composed of the third metal film 37. In this way, the source line 27, which is composed of the third metal film 37 in the first area A1, is located midway between the first touch line 31α, which is composed of one of the first metal film 32 and the fourth metal film 39, and the first area side second touch line constituting portion 44, which constitutes the second touch line 31β and is composed of the other of the first metal film 32 and the fourth metal film 39. Accordingly, in comparison with a case where a source line is composed of either the first metal film 32 or the fourth metal film 39, i.e. a case where the source line 27 is not located midway between the first touch line 31α and the first area side second touch line constituting portion 44, a parasitic capacitance that is formed between the first touch line 31α and the second touch line 31β can be made smaller, so that sensitivity related to position detection can be kept high.

Further, the first touch line 31α is composed of the fourth metal film 39, and the first area side second touch line constituting portion 44 of the second touch line 31β is composed of the first metal film 32. In this way, while the first touch electrode 30α is supplied with a signal that is transmitted by the first touch line 31α, which is composed of the fourth metal film 39, the second touch electrode 30β is supplied with a signal that is transmitted by the second touch line 31β, whose first area side second touch line constituting portion 44 is composed of the first metal film 32.

Further, the second touch line 31β has a second area side second touch line constituting portion (second area side second position detecting line constituting portion) 45 placed in the second area A2, and the second area side second touch line constituting portion 45 has a second touch electrode connected portion (second position detecting electrode connected portion) 45A, composed of the fourth metal film 39 and connected to the second touch electrode 30β, a part of which overlaps the first area side second touch line constituting portion 44 and is connected to the first area side second touch line constituting portion 44 through a relay contact hole CH3 bored through a lower insulating film 33, a gate insulating film 35, and a first interlayer insulating film 38 that are insulating films sandwiched between the second touch electrode connected portion 45A and the first area side second touch line constituting portion 44. In this way, a signal that is transmitted from the driver 12 to the first area side second touch line constituting portion 44 of the second touch line 31β is relayed to the second touch electrode portion 45A of the second area side second touch line constituting portion 45, which is connected to the first area side second touch line constituting portion 44 through the relay contact hole CH3, and is supplied to the second touch electrode 30β, which is connected to the second touch electrode connected portion 45A. Since the first touch line 31α, which is connected to the touch electrode 30α, and the second touch electrode connected portion 45A, which is connected to the second touch electrode 30β, are both composed of the fourth metal film 39, there is commonality between a connection stricture of the first touch line 31α with respect to the first touch electrode 30α and a connection structure of the second touch electrode connected portion 45A with respect to the second touch electrode 30β.

Further, the second area side second touch line constituting portion 45 has a second touch electrode unconnected portion (second position detecting electrode unconnected portion) 45B composed of the first metal film 32, placed so as to overlap the second touch electrode connected portion 45A, and concatenated to the first area side second touch line constituting portion 44. In this way, the second touch electrode unconnected portion 45B is not directly connected to the second touch electrode 30β but, by being concatenated to the first area side second touch line constituting portion 44, which is made of the same first metal film 32, is supplied with the same signal as the second touch electrode connected portion 45A, which the second touch electrode unconnected portion 45B overlaps. While the source line 27 is located midway between the first touch line 31α and the first area side second touch line constituting portion 44 of the second touch line 31β in the first area A1, the source line 27 is located midway between the second touch electrode connected portion 45A and the second touch electrode unconnected portion 45B of the second area side second touch line constituting portion 45 of the second touch line 31β in the second area A2. Accordingly, in comparison with a case where the second touch electrode unconnected portion 45B is not installed, the first area A1 and the second area A2 can be made equal in parasitic capacitance that is formed between the source line 27 and the pixel electrode 24. This makes it hard for a luminance difference to appear between the first area A1 and the second area A2 in an image that is displayed in the display area AA, giving superior display quality.

Further, the liquid crystal display device 10 further includes an intermediate electrode 46 placed so as to overlap both the second touch electrode connected portion 45A and the first area side second touch line constituting portion 44 and composed of the third metal film 37. The intermediate electrode 46 is connected to the first area side second touch line constituting portion 44 through a first relay contact hole CH3A, bored through a lower insulating film 33 and a gate insulating film 35 that are insulating films sandwiched between the intermediate electrode 46 and the first area side second touch line constituting portion 44, that constitutes the relay contact hole CH3, and is connected to the second touch electrode connected portion 45A through a second relay contact hole CH3B, bored through a first interlayer insulating film 38 that is an insulating film sandwiched between the intermediate electrode 46 and the second touch electrode connected portion 45A, that constitutes the relay contact hole CH3. In this way, the first area side second touch line constituting portion 44 and the second touch electrode connected portion 45A are indirectly connected to each other via the intermediate electrode 46, which is composed of the third metal film 37. In comparison with a case where a first area side line constituting portion and an electrode connected portion are directly connected to each other, the intermediate electrode 46 alleviates the difference in level in the second touch electrode connected portion 45A, which is composed of the fourth metal film 39. This gives high connection reliability and is suitable to bringing about improvement in yield.

Further, the liquid crystal display device 10 further includes a black matrix (light shielding unit) 29, placed so as to overlap at least both the first area side second touch line constituting portion 44 and the second touch electrode connected portion 45A, that blocks light. In the vicinity of a site of overlap between the first area side second touch line constituting portion 44 and the second touch electrode connected portion 45A, which are connected to each other through the relay contact hole CH3, display unevenness attributed to the connection structure tends to be easily visually recognized. In that regard, the black matrix 29, which is placed so as to overlap at least both the first area side second touch line constituting portion 44 and the second touch electrode connected portion 45A, makes it hard to visually recognize display unevenness attributed to the connection structure.

Further, the pixel PX has a longitudinal shape whose lateral direction coincides with the direction of extension, and a plurality of the source lines 27, a plurality of the first touch lines 31α, and a plurality of the second touch lines 31β are placed side by side at spacings in a longitudinal direction of the pixel PX. In the configuration in which the plurality of source lines 27 are placed side by side at spacings in the longitudinal direction of the pixel PX, the number of source lines 27 that are installed tends to be smaller than in a case where a plurality of source lines are arranged at spacings in the lateral direction of the pixel PX. On the other hand, since the first touch line 31α and the second touch line 31β are each placed so as to overlap the source line 27, the numbers of first touch lines 31α and second touch lines 31β that are installed can be sufficiently ensured even if the number of source lines 27 that are installed is small. This sufficiently ensures the numbers of first touch electrodes 30α and second touch electrodes 30β that are installed, making it possible to bring about improvement in position detection accuracy.

Embodiment 2

Embodiment 2 is described with reference to FIG. 11. Embodiment 2 illustrates changes made to achieve a relay connection structure between a first area side second touch line constituting portion 144 and a second touch electrode connected portion 145A. It should be noted that a repeated description of structures, workings, and effects which are similar to those of Embodiment 1 is omitted.

Figure 11:
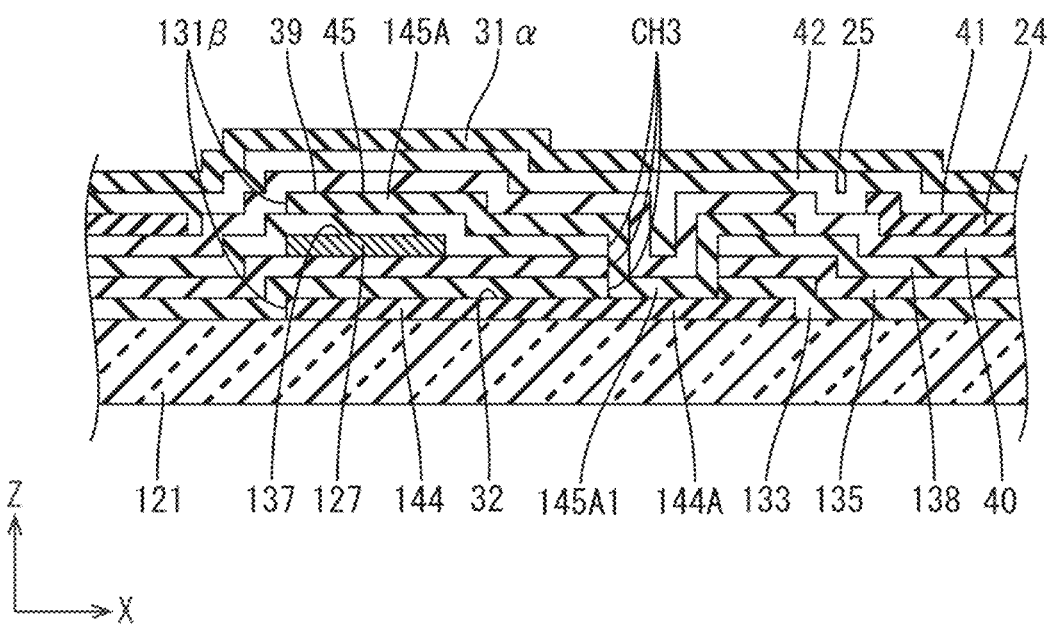
FIG. 11 is a cross-sectional view of the vicinity of a relay connection point of a second touch line over an array substrate constituting a liquid crystal panel with which a liquid crystal display device according to Embodiment 2 is provided.

As shown in FIG. 11, a first area side second touch line constituting portion 144 and a second touch electrode connected portion 145A of a second touch line 131β according to the present embodiment are directly connected to each other through the relay contact hole CH3. In particular, a first relay connection portion 144A of the first area side second touch line constituting portion 144 and a second relay connected portion 145A1 of the second touch electrode connected portion 145A are directly connected to each other through the relay contact hole CH3 bored in a communicating manner through a lower insulating film 133, a gate insulating film 135, and a first interlayer insulating film 138 that are sandwiched between the first relay connected portion 144A and the second relay connected portion 145A1. This makes it possible to omit the intermediate electrode (see FIG. 9) described in Embodiment 1 above, thus eliminating the need to adopt a design with consideration given so that the intermediate electrode does not get short-circuited with a source line 127 composed of the same third metal film 137 as the intermediate electrode. This is suitable to improving the degree of freedom in design.

As described above, according to the present embodiment, the first area side second touch line constituting portion 144 and the second touch electrode connected portion 145A are directly connected to each other through the relay contact hole CH3 bored in a communicating manner through a lower insulating film 133, a gate insulating film 135, and a first interlayer insulating film 138 that are a plurality of insulating films sandwiched between the first area side second touch line constituting portion 144 and the second touch electrode connected portion 145A. If a first area side line constituting portion and an electrode connected portion are indirectly connected to each other via an intermediate electrode composed of the third metal film 137, the need arises to adopt a design with consideration given so that the intermediate electrode does not get short-circuited with a source line 127 composed of the third metal film 137. On the other hand, when a configuration is adopted in which the first area side second touch line constituting portion 144 and the second touch electrode connected portion 145A are directly connected to each other, such design consideration is no longer needed. This is suitable to improving the degree of freedom in design.

Embodiment 3

Embodiment 3 is described with reference to FIGS. 12 to 14. Embodiment 3 illustrates changes made from Embodiment 1 to achieve a configuration of a second touch line 231β. It should be noted that a repeated description of structures, workings, and effects which are similar to those of Embodiment 1 is omitted.

Figure 12:
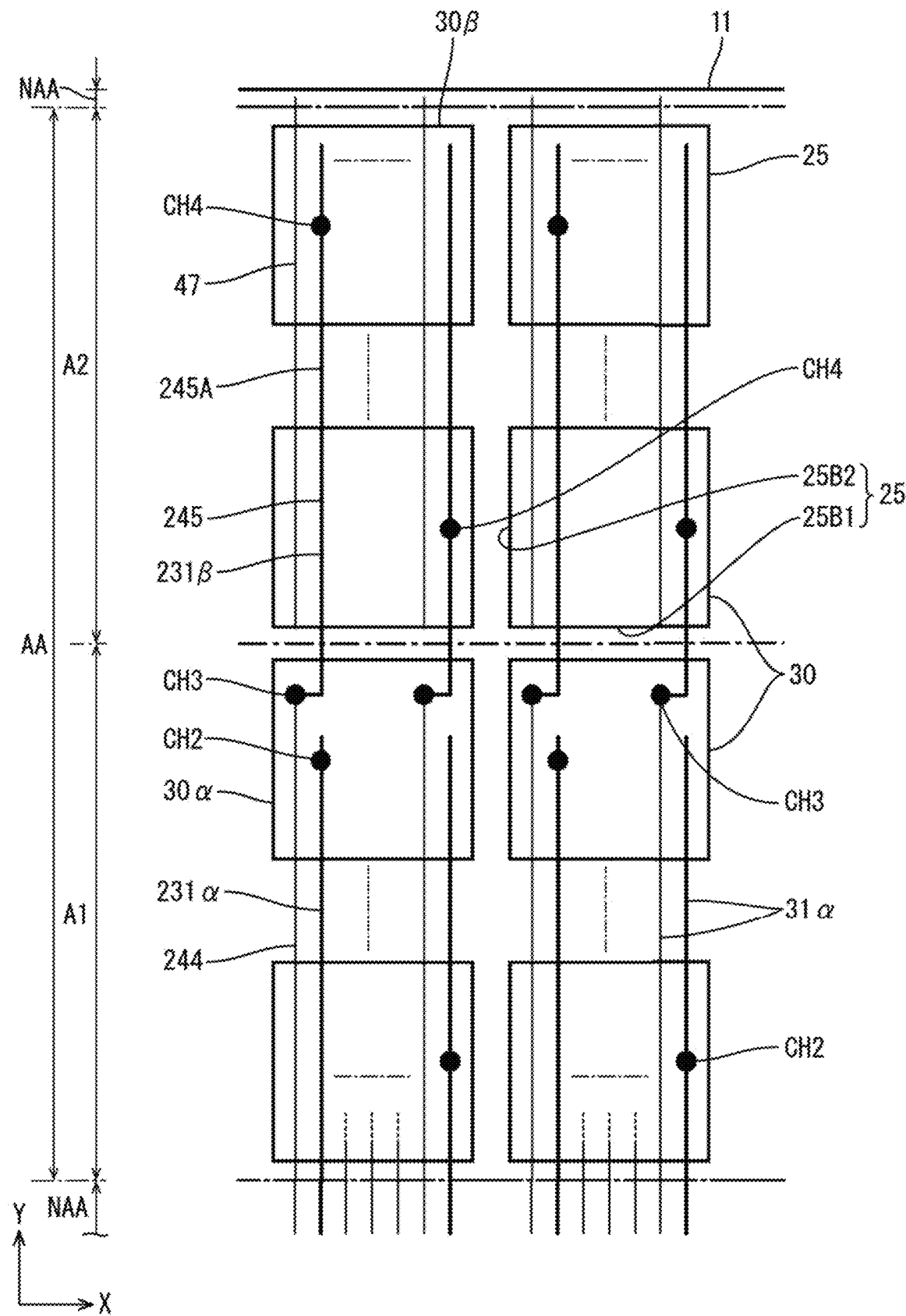
FIG. 12 is an enlarged plan view showing touch electrodes, touch lines, and the like of a liquid crystal panel with which a liquid crystal display device according to Embodiment 3 is provided.
Figure 13:
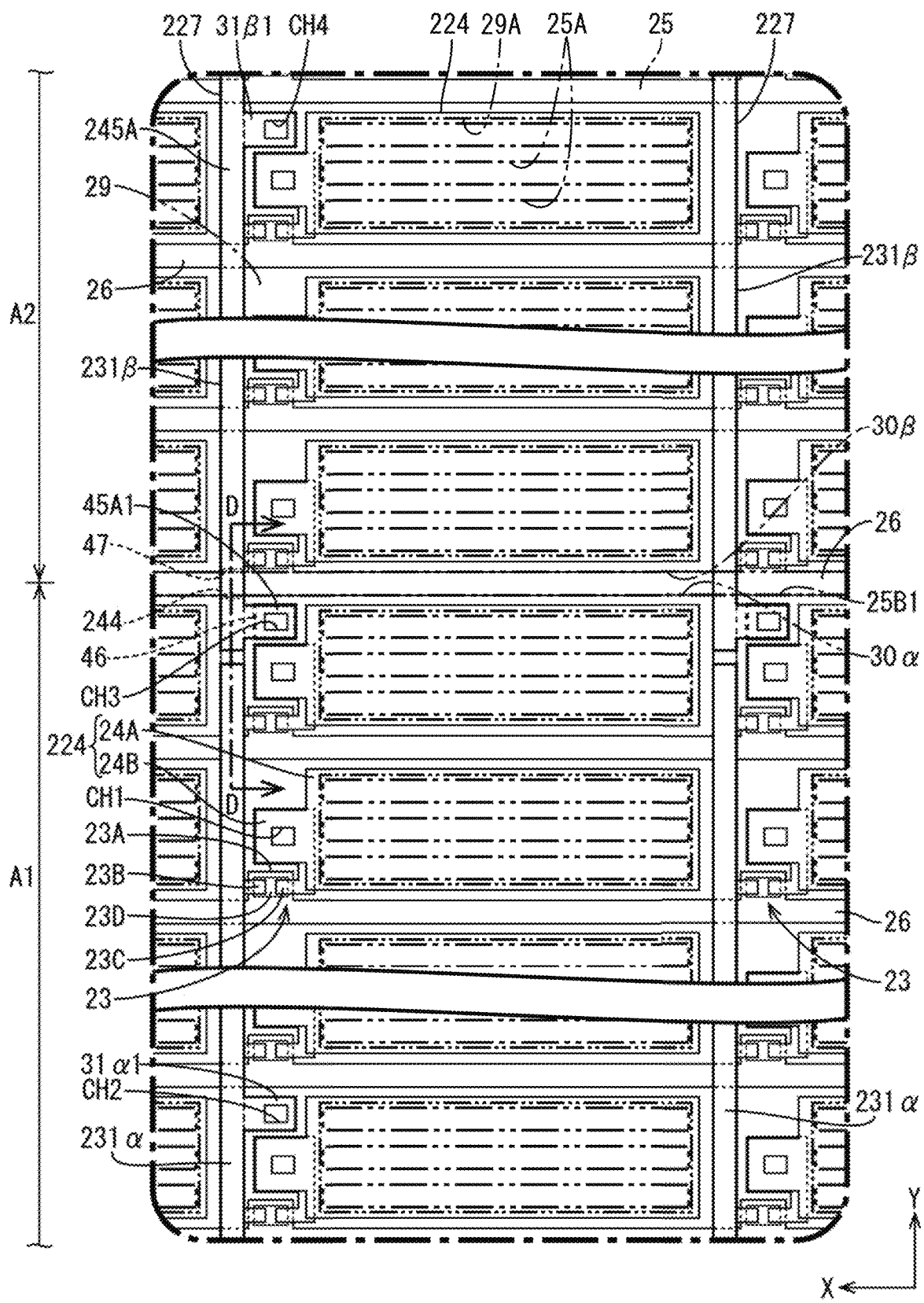
FIG. 13 is a plan view showing a pixel array of the liquid crystal panel.
Figure 14:
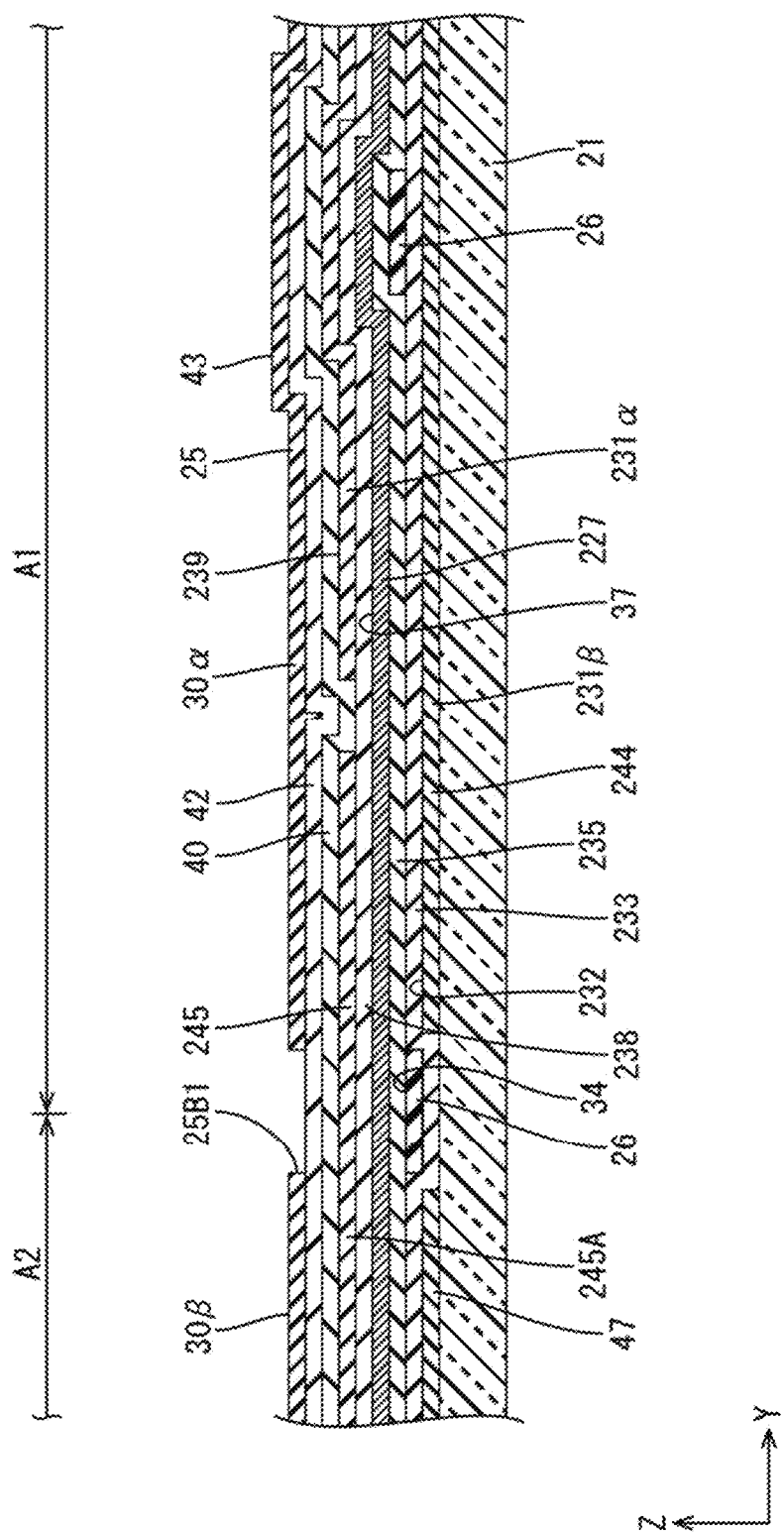
FIG. 14 is a cross-sectional view of an array substrate constituting the liquid crystal panel as taken along line D-D in FIG. 13.

As shown in FIGS. 12 to 14, the second touch line 231β according to the present embodiment has a second area side second touch line constituting portion 245 having a single-layer structure constituted solely by a second touch electrode connected portion 245A composed of a fourth metal film 239. That is, in the present embodiment, the electrode unconnected portion (see FIGS. 2 and 7) described in Embodiment 1 above is omitted. It should be noted that FIGS. 12 and 13 show a lower side facing toward a driver in the Y-direction and an upper side facing away from the driver in the Y-axis direction. A non-touch line (non-position detecting line) 47 composed of a first metal film 232 is placed so as to overlap the second area side second touch line constituting portion 245 (second touch electrode connected portion 245A) thus configured. The non-touch line 47 extends along the Y-axis direction and is disposed at a lower layer than a source line 227 to overlap the source line 227 via a lower insulating film 233 and a gate insulating film 235. The non-touch line 47 is disposed at a lower layer than the second area side second touch line constituting portion 245, which is composed of the fourth metal film 239, to overlap the second area side second touch line constituting portion 245 via the lower insulating film 233, the gate insulating film 235, the source line 227, and a first interlayer insulating film 238. Moreover, an end of the non-touch line 47 that faces the driver is separated from an end of the first area side second touch line constituting portion 244, which is composed of the same first metal film 232, that faces away from the driver, and is disposed at a spacing from the end. That is, the non-touch line 47 is unconnected to the first area side second touch line constituting portion 244, and is electrically independent of the second touch line 231β. According to such a configuration, while the source line 227 is located midway between a first touch line 231α and the first area side second touch line constituting portion 244 of the second touch line 231β in the first area A1, the source line 227 is located midway between the second touch electrode connected portion 245A and the non-touch line 47 of the second area side second touch line constituting portion 245 of the second touch line 231β in the second area A2. Accordingly, a parasitic capacitance that is formed between the second touch line 231β and the source line 227 can be made smaller, so that sensitivity related to touch detection (position detection) in the second area A2 can be kept high. Further, an end of the non-touch line 47 that faces away from the driver is drawn out to the non-display area NAA to receive the supply of a common potential that is supplied from an outside source via a flexible substrate. That is, the non-touch line 47 can be said to be a "common line". Thus, in comparison with a case where the non-touch line 47 is not installed, the first area A1 and the second area A2 can be made equal in parasitic capacitance that is formed between the source line 227 and a pixel electrode 224. This makes it hard for a luminance difference to appear between the first area A1 and the second area A2 in an image that is displayed in the display area AA, giving superior display quality.

As described above, the present embodiment further includes a non-touch line (non-position detecting line) 47 composed of the first metal film 232, placed so as to overlap the source line 227 and the second area side second touch line constituting portion 245 in the second area A2, and unconnected to the first area side second touch line constituting portion 244. In this way, while the source line 227 is located midway between the first touch line 231α and the first area side second touch line constituting portion 244 of the second touch line 231β in the first area A1, the source line 227 is located midway between the second touch electrode connected portion 245A and the non-touch line 47 of the second area side second touch line constituting portion 245 of the second touch line 231β in the second area A2. Accordingly, a parasitic capacitance that is formed between the second touch line 231β and the source line 227 can be made smaller, so that sensitivity related to touch detection (position detection) in the second area A2 can be kept high.

Further, the non-touch line 47 is supplied with a common potential. Thus, in comparison with a case where the non-touch line 47 is not installed, the first area A1 and the second area A2 can be made equal in parasitic capacitance that is formed between the source line 227 and the pixel electrode 224. This makes it hard for a luminance difference to appear between the first area A1 and the second area A2 in an image that is displayed in the display area AA, giving superior display quality.

Embodiment 4

Embodiment 4 is described with reference to FIGS. 15 to 18. Embodiment 4 illustrates changes made from Embodiment 1 to achieve a division of a display area AA, a configuration of a touch line 331, and the like. It should be noted that a repeated description of structures, workings, and effects which are similar to those of Embodiment 1 is omitted.

Figure 15:
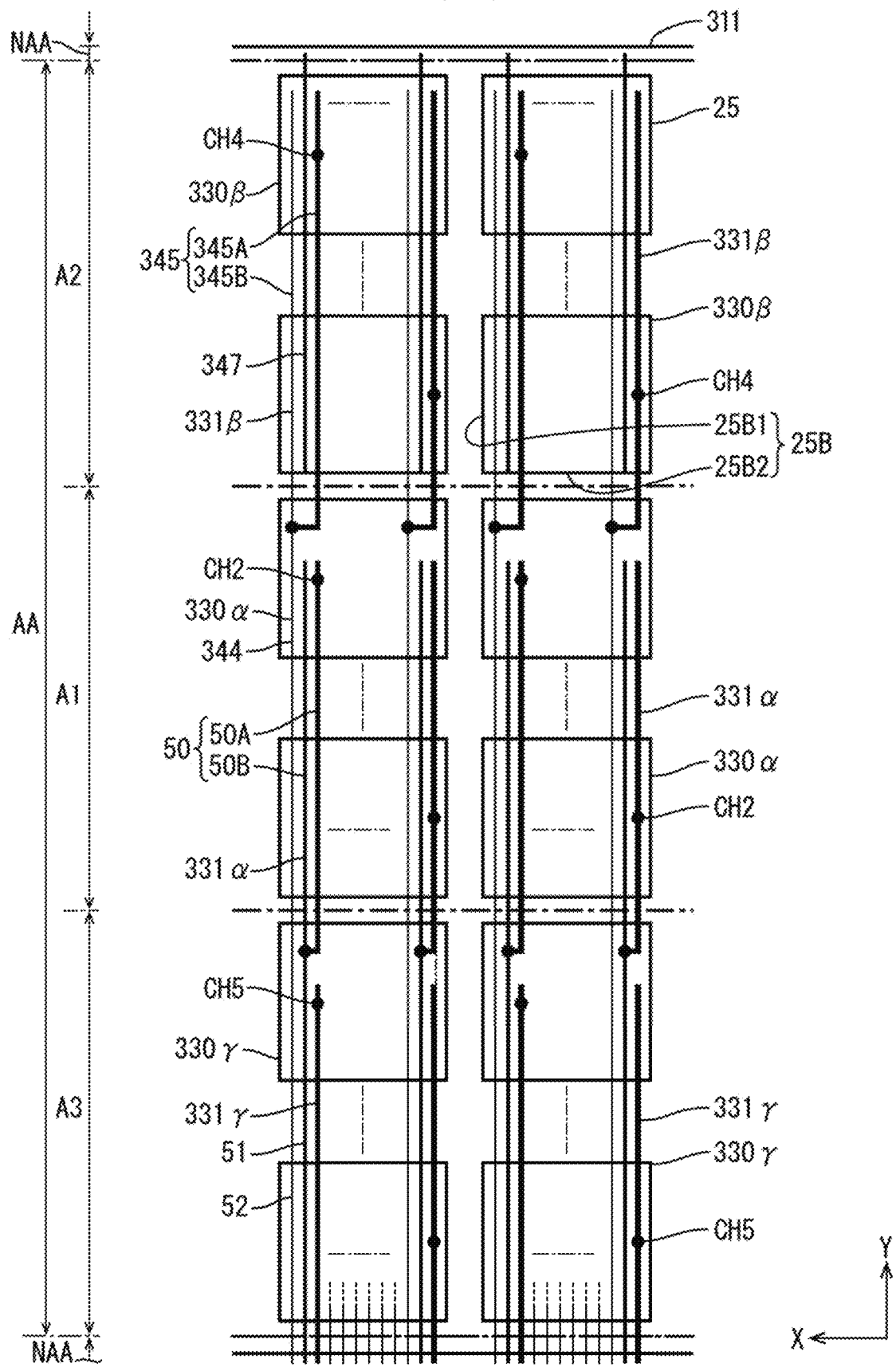
FIG. 15 is an enlarged plan view showing touch electrodes, touch lines, and the like of a liquid crystal panel with which a liquid crystal display device according to Embodiment 4 is provided.

As shown in FIG. 15, a liquid crystal display panel 311 according to the present embodiment has a display area AA divided into a first area A1, a second area A2, and a third area A3 located closer to a driver than the first area A1 in the Y-axis direction. It should be noted that FIG. 15 shows a lower side facing toward the driver in the Y-direction and an upper side facing away from the driver in the Y-axis direction. The three areas A1 to A3, which constitute the display area AA, is arranged in the order of the third area A3, the first area A1, and the second area A2 in order of proximity to the driver. The display area AA is equally divided so that the first area A1, the second area A2, and the third area A3 are substantially equal in area ratio to each other. Accordingly, a touch electrode 330 includes, in addition to a first touch electrode 330α and a second touch electrode 330β, a third touch electrode (third position detecting electrode) 330γ placed in the third area A3. The numbers of first touch electrodes 330α, second touch electrodes 330β, and third touch electrodes 330γ that are installed are substantially equal to one another. Moreover, a touch line 331 includes, in addition to a first touch line 331α and a second touch line 331β, a third touch line (third position detecting line) 331γ connected to the third touch electrode 330γ. The third touch line 331γ is placed only in the third area A3. On the other hand, the first touch line 331α is placed in such a manner as to lie astride the first area A1 and the third area A3. Furthermore, the second touch line 331β is placed in such a manner as to lie astride the first area A1, the second area A2, and the third area A3. Such a configuration makes it possible to ensure a larger number of touch lines 331 that are installed. This makes it possible to increase the number of touch electrodes 330 that are installed, making it possible to bring about further improvement in position detection accuracy. Moreover, since the first touch line 331α, the second touch line 331β, and the third touch line 331γ are all placed so as to overlap a source line 327, an aperture ratio of a pixel can be kept high in the first area A1, the second area A2, and the third area A3.

Figure 16:
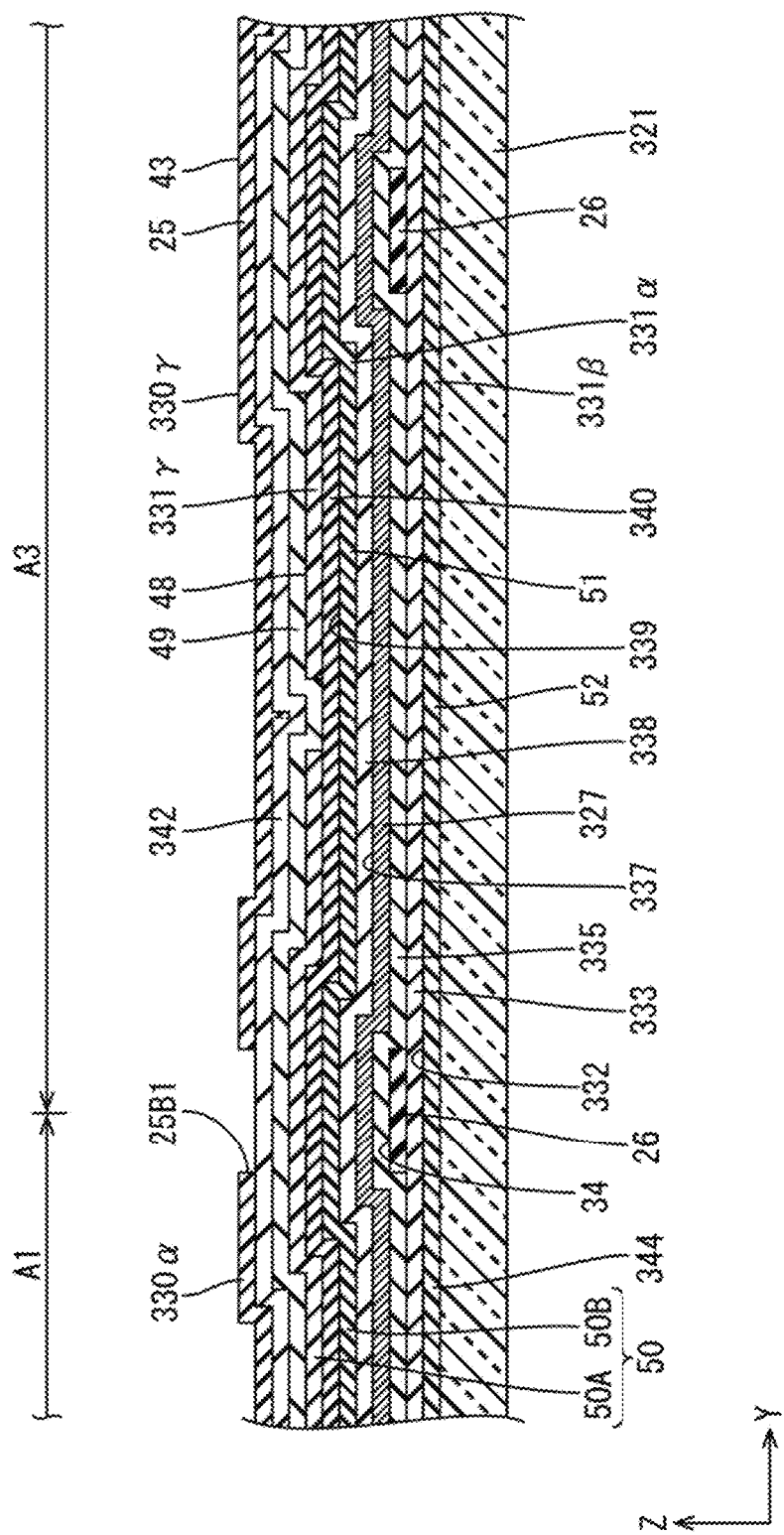
FIG. 16 is a cross-sectional view of a first touch line, a second touch line, a third touch line, and the like as taken along a direction of extension in the vicinity of a boundary between a first area and a third area over an array substrate constituting the liquid crystal panel.
Figure 17:
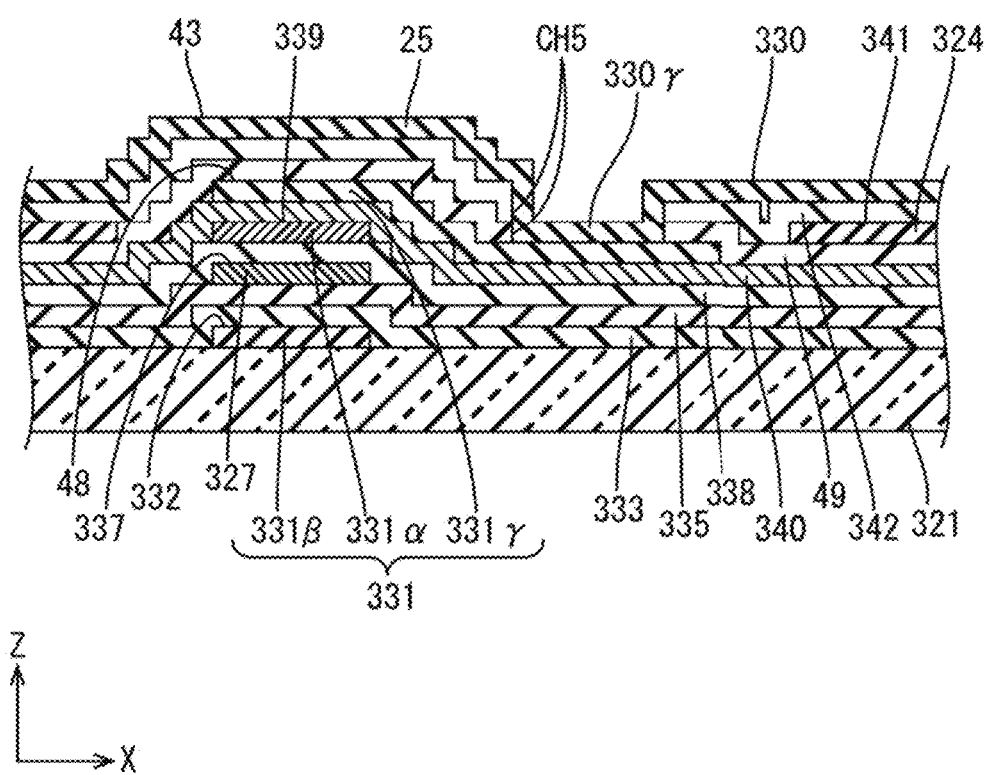
FIG. 17 is a cross-sectional view of the vicinity of a connection point between the third touch line and a third touch electrode over the array substrate.

A configuration of a third touch line 331γ is described with reference to FIGS. 16 and 17 in addition to FIG. 15. FIG. 16 is a cross-sectional view of a first touch line 331α, a second touch line 331β, a third touch line 331γ, and the like as taken along a direction of extension in the vicinity of a boundary between the first area A1 and the third area A3 over an array substrate 321. FIG. 17 is a cross-sectional view of the vicinity of a connection point between the third touch line 331γ and a third touch electrode 330γ over the array substrate 321. As shown in FIGS. 15 and 16, the third touch line 331γ extends in such a manner as to run parallel to the source line 327 in the third area A3 and is placed so as to overlap the source line 327, the first touch line 331α, and the third touch line 331β. An end of the third touch line 331γ that faces toward the driver is drawn out to the non-display area NAA to be connected to the driver, an end of the third touch line 331γ that faces away from the driver is connected to the third touch electrode 330γ. The third touch line 331γ has a single-layer structure constituted by a fifth metal film 48 placed at a higher layer than a fourth metal film 339 via a second interlayer insulating film 340. As shown in FIGS. 16 and 17, a third interlayer insulating film 49 for insulating the fifth metal film 48 from a first transparent electrode film 341 is placed at a higher layer than the fifth metal film 48. As shown in FIG. 17, the third touch line 331γ, which is composed of the fifth metal film 48, is connected to the third touch electrode 330γ through a third touch electrode contact hole CH5 bored through the third interlayer insulating film 49 and an inter-electrode insulating film 342. It should be noted that FIG. 15 uses the thinnest solid lines to illustrate portions of the first, second, and third touch lines 331α, 331β, and 331γ composed of a first metal film 332, uses moderately thick solid lines to illustrate portions of the first, second, and third touch lines 331α, 331β, and 331γ composed of the fourth metal film 339, and uses the thickest solid lines to illustrate portions of the first, second, and third touch lines 331α, 331β, and 331γ composed of the fifth metal film 48.

Figure 18:
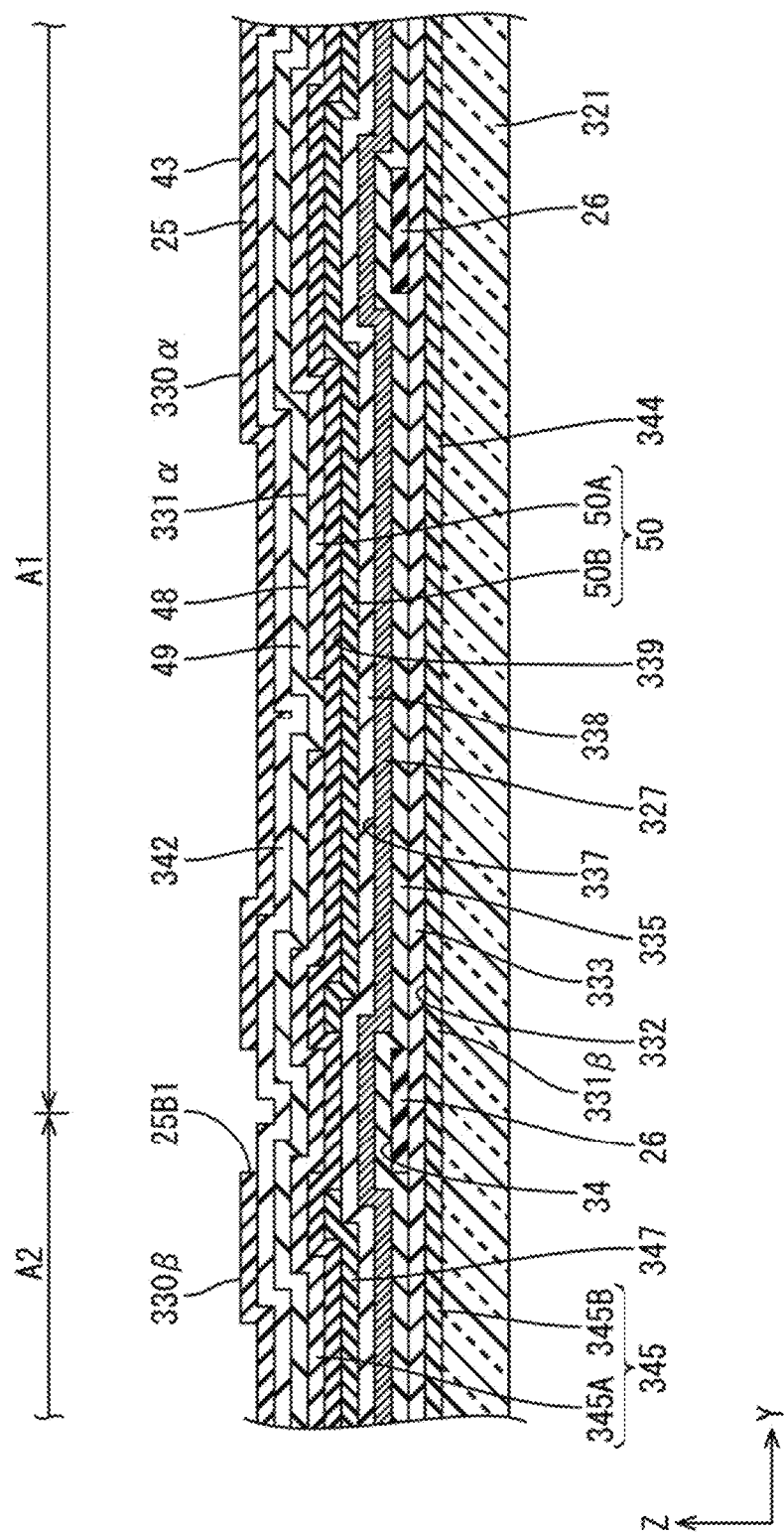
FIG. 18 is a cross-sectional view of a first touch line, a second touch line, and the like as taken along the direction of extension in the vicinity of a boundary between a first area and a second area over the array substrate constituting the liquid crystal panel.

In the following, a configuration of a first touch line 331α is described with reference to FIG. 18 in addition to FIGS. 15 and 16. FIG. 18 is a cross-sectional view of a first touch line 331α, a second touch line 331β, and the like as taken along the direction of extension in the vicinity of a boundary between the first area A1 and the second area A2 over the array substrate 321. As shown in FIGS. 15 and 16, the first touch line 331α is constituted by a first area side first touch line constituting portion (first area side first position detecting line constituting portion) 50 placed in the first area A1 and a third area side first touch line constituting portion (third area side first position detecting line constituting portion) 51 placed in the third area A3. Of these, the third area side first touch line constituting portion 51 has a single-structure composed of the fourth metal film 339, is disposed to overlap the third touch line 331γ, which is composed of the fifth metal film 48, via the second interlayer insulating film 340, and is disposed to overlap the source line 327, which is composed of the third metal film 337, via a first interlayer insulating film 338. The first area side first touch line constituting portion 50 has a laminated structure constituted by a first touch electrode connected portion (first position detection electrode connected portion) 50A connected to the first touch electrode 330α and a first touch electrode unconnected portion (first position detecting electrode unconnected portion) 50B unconnected to the first touch electrode 330α. The first touch electrode connected portion 50A is composed of the fifth metal film 48, and is connected to the third touch electrode 330γ through a first touch electrode contact hole CH2 bored through the third interlayer insulating film 49 and the inter-electrode insulating film 342. The first touch electrode unconnected portion 50B is composed of the fourth metal film 339, is disposed to overlap the first touch electrode connected portion 50A, which is composed of the fifth metal film 48, via the second interlayer insulating film 340, and is disposed to overlap the source line 327, which is composed of the third metal film 337, via the first interlayer insulating film 338. An end of the first touch electrode unconnected portion 50B that faces toward the driver is concatenated to an end of the third area side first touch line constituting portion 51 that faces away from the driver.

Next, a configuration of a second touch line 331β is described with reference to FIGS. 15, 16, and 18. As shown in FIGS. 15, 16, and 18, the second touch line 331β includes, in addition to a first area side second touch line constituting portion 344 and a second area side second touch line constituting portion 345, a third area side second touch line constituting portion (third area side position detecting line constituting portion) 52 placed in the third area A3. The third area side second touch line constituting portion 52 has a single-layer structure composed of the first metal film 332, as is the case with the first area side second touch line constituting portion 344. The third area side second touch line constituting portion 52 is disposed at a lower layer than the source line 327, which is composed of the third metal film 337, to overlap the source line 327 via a lower insulating layer 333 and a gate insulating layer 335. An end of the third area side second touch line constituting portion 52 that faces toward the driver is drawn out to the non-display area NAA to be connected to the driver, an end of the third area side second touch line constituting portion 52 that faces away from the driver is concatenated to an end of the first area side second touch line constituting portion 344 that faces toward the driver.

As shown in FIGS. 15 and 18, the second area side second touch line constituting portion 345 has a second touch electrode connected portion 345A composed of the fifth metal film 48 and a second touch electrode unconnected portion 345B composed of the first metal film 332. The second touch electrode connected portion 345A, which is composed of the fifth metal film 48, is connected to the third touch electrode 330γ through a second touch electrode contact hole CH4 bored through the third interlayer insulating film 49 and the inter-electrode insulating film 342. The second touch electrode unconnected portion 345B, which is composed of the first metal film 332, is disposed at a lower layer than the source line 327, which is composed of the third metal film 337, to overlap the source line 327 via the lower insulating layer 333 and the gate insulating layer 335. An end of the second touch electrode unconnected portion 50B that faces toward the driver is concatenated to an end of the first area side second touch line constituting portion 344 that faces away from the driver.

In the present embodiment, as shown in FIGS. 15 and 18, a non-touch line 347 composed of the fourth metal film 339 is placed so as to overlap the second area side second touch line constituting portion 345 thus configured. The non-touch line 347 extends along the Y-axis direction in the second area A2, is disposed at a higher layer than the source line 327 to overlap the source line 327 via the first interlayer insulating film 338, and is disposed at a lower layer than the second touch electrode connected portion 345A to overlap the second touch electrode connected portion 345A via the second interlayer insulating film 340. Accordingly, the non-touch line 347 is electrically independent of the source line 327 and the second touch line 331β, and an end of the non-touch line 347, which is placed in the second area A2, that faces toward the driver is separated from an end of the first touch electrode unconnected portion 50B, which is composed of the same fourth metal film 339 and placed in the first area A1, that faces away from the driver, and is disposed at a spacing from the end. That is, the non-touch line 347 is unconnected to the first touch electrode unconnected portion 50B, and is electrically independent of the first touch line 331α. According to such a configuration, while the source line 327 is located midway between the third area side first touch line constituting portion 51 and the third area side second touch line constituting portion 52 in the third area A3, is located midway between the first touch electrode unconnected portion 50B and the first area side second touch line constituting portion 344 in the first area A1, and is located midway between the non-touch line 347 and the second touch electrode unconnected portion 345B in the second area A2. Accordingly, a parasitic capacitance that is formed between the second touch line 331β and the source line 327 can be made smaller, so that sensitivity related to touch detection (position detection) in the second area A2 can be kept high. An end of the non-touch line 347 that faces away from the driver is drawn out to the non-display area NAA to receive the supply of a common potential that is supplied from an outside source via a flexible substrate. That is, the non-touch line 347 can be said to be a "common line". Thus, in comparison with a case where the non-touch line 347 is not installed, the first area A1, the second area A2, and the third area A3 can be made equal in parasitic capacitance that is formed between the source line 327 and a pixel electrode. This makes it hard for a luminance difference to appear among the first area A1, the second area A2, and the third area A3 in an image that is displayed in the display area AA, giving superior display quality.

As described above, the present embodiment further includes: a third touch electrode (third position detecting electrode) 330γ that, when the display area AA is divided into the first area A1, the second area A2, and a third area A3 located closer to the driver than the first area A1 in the direction of extension, is placed in the third area A3, forms a capacitance with the position input body, and detects the input position; and a third touch line (third position detecting line) 331γ placed so as to run parallel to the source line 327 and overlap the source line 327 in the third area A3 and connected to the driver and the third touch electrode 330γ. The first touch line 331α is placed in such a manner as to lie astride the first area A1 and the third area A3. The second touch line 331β is placed in such a manner as to lie astride the first area A1, the second area A2, and the third area A3. In this way, the first touch electrode 330α, the second touch electrode 330β, and the third touch electrode 330γ form capacitances with the position input body, which performs position input, and can detect, through the use of signals that are supplied via the first touch line 331α, the second touch line 331β, and the third touch line 331γ from the driver, input positions inputted by the input position body, respectively. Of these, the third touch electrode 330γ is placed in the third area A3, which is located closer to the driver than the first area A1 in the direction of extension of the source line 327, of the display area AA, and to the third touch electrode 330γ, the third touch line 331γ, which runs parallel to the source line 327 in the third area A3, is connected. This makes it possible to ensure more first touch lines 331α, second touch lines 331β, and third touch lines 331γ. This makes it possible to increase the numbers of first touch electrodes 330α, second touch electrodes 330β, and third touch electrodes 330γ that are installed, making it possible to bring about further improvement in position detection accuracy. Moreover, since the third touch line 331γ, which is placed in the third area A3, the first touch line 331α, which is placed in such a manner as to lie astride the first area A1 and the third area A3, and the second touch line 331β, which is placed in such a manner as to lie astride the first area A1, the second area A2, and the third area A3, are all placed so as to overlap the source line 327, an aperture ratio of the pixel can be kept high in the first area A1, the second area A2, and the third area A3.

Other Embodiments

The technology disclosed herein is not limited to the embodiments described with reference to the foregoing description and drawings. For example, embodiments such as those listed below are encompassed in the technical scope.

(1) Alternatively, the second touch electrode connected portion 45A, 245A, or 345A and the second touch electrode unconnected portion 45B or 345B of the second area side second touch line constituting portion 45, 245, and 345 may be directly connected to each other. In that case, the connection structure between the first area side second touch line constituting portion 44, 144, 244, or 344 and the second touch electrode connected portion 45A, 245A, or 345A may be omitted or may be allowed to remain for the purpose of securing redundancy.

(2) Alternatively, the portion (second touch electrode unconnected portion 45B or 345B) of the second touch line 31β, 131β, 231β, or 331β composed of the first metal film 32, 232, or 332 in the second area A2 may be connected to the second touch electrode 30β or 330β. In that case, the configuration in which the portion (second touch electrode connected portion 45A, 245A, or 345A) of the second touch line 31β, 131β, 231β, or 331β composed of the fourth metal film 39, 239, or 339 or the fifth metal film 48 in the second area A2 is connected to the touch electrode 30β or 330β may be omitted or may be allowed to remain for the purpose of securing redundancy. Further, the portion of the second touch line 31β, 131β, 231β, or 331β composed of the fourth metal film 39, 239, or 339 or the fifth metal film 48 in the second area A2 per se may be omitted. Further, the connection structure between the first area side second touch line constituting portion 44, 144, 244, or 344 and the second touch electrode connected portion 45A, 245A, or 345A may be omitted or may be allowed to remain.

(3) Alternatively, the connection structure between the first area side second touch line constituting portion 44, 144, 244, or 344 and the second touch electrode connected portion 45A, 245A, or 345A may be placed beside the second area A2. In that case, the end of the first area side second touch line constituting portion 44, 144, 244, or 344 that faces away from the driver 12 is placed to extend toward the second area A2.

(4) In each of the configurations of Embodiments 1 to 3 described above, the first touch line 31α or 231α may have a single-layer structure composed of the first metal film 32 or 232, and the second touch line 31β, 131β, or 231β may have a single-layer structure composed of the fourth metal film 39 or 239.

(5) In the configuration of Embodiment 4 described above, the third touch line 331γ may have a single-layer structure composed of the first metal film 332, the first touch line 331α may have a single-layer structure composed of the fourth metal film 339, and the second touch line 331β may have a single-layer structure composed of the fifth metal film 48. Alternatively, the third touch line 331γ may have a single-layer structure composed of the first metal film 332, the first touch line 331α may have a single-layer structure composed of the fifth metal film 48, and the second touch line 331β may have a single-layer structure composed of the fourth metal film 339. Alternatively, the third touch line 331γ may have a single-layer structure composed of the fourth metal film 339, the first touch line 331α may have a single-layer structure composed of the first metal film 332, and the second touch line 331β may have a single-layer structure composed of the fifth metal film 48. Alternatively, the third touch line 331γ may have a single-layer structure composed of the fourth metal film 339, the first touch line 331α may have a single-layer structure composed of the fifth metal film 48, and the second touch line 331β may have a single-layer structure composed of the first metal film 332. Alternatively, the third touch line 331γ may have a single-layer structure composed of the fifth metal film 48, the first touch line 331α may have a single-layer structure composed of the first metal film 332, and the second touch line 331β may have a single-layer structure composed of the fourth metal film 339. Alternatively, the third touch line 331γ may have a single-layer structure composed of the fifth metal film 48, the first touch line 331α may have a single-layer structure composed of the fourth metal film 339, and the second touch line 331β may have a single-layer structure composed of the first metal film 332.

(6) Alternatively, the gate line 226 may be composed of the first metal film 32, 232, or 332, and the source line 27, 127, 227, or 327 may be composed of the third metal film 37, 137, or 337. In that case, the touch line 31 or 331 is composed of the second metal film 34 or the fourth metal film 39, 239, or 339.

(7) Alternatively, the gate line 226 may be composed of the first metal film 32, 232, or 332, and the source line 27, 127, 227, or 327 may be composed of the second metal film 34. In that case, the touch line 31 or 331 is composed of the third metal film 37, 137, or 337 or the fourth metal film 39, 239, or 339.

(8) Alternatively, the gate line 226 may be composed of the third metal film 37, 137, or 337, and the source line 27, 127, 227, or 327 may be composed of the second metal film 34. In that case, the TFT 23 is of a top-gate type in which the gate electrode 23A is placed at a higher layer than the channel portion 23D. In a case where the TFT 23 is of a top-gate type, it is also possible to adopt a double-gate structure in which a lower gate electrode composed of the first metal film 32, 232, or 332 is added at a lower layer than the channel portion 23D. In either case, the touch line 31 or 331 is composed of the first metal film 32, 232, or 332 or the fourth metal film 39, 239, or 339.

(9) It is also possible to divide the display area AA into four or more areas. In that case, the touch electrode 30 or 330 is divided into four or more types that are placed in the four or more areas in the display area AA, and the touch line 31 or 331 is divided into four or more types that are connected to the four or more types of touch electrode 30 or 330.

(10) The number of drivers 12 that are placed on one side of the display area AA in the Y-axis direction may be changed to 3 or less or 5 or more.

(11) The drivers 12 may be placed so that the display area AA is interposed between the drivers 12 on both sides in the Y-axis direction. In that case, the display area AA is divided into four or a larger even number of areas.

(12) The conductive film that constitute the touch line 31 or 331 is not limited to a metal film, but may be a transparent electrode film or a low-resistivity region of a semiconductor film.

(13) The pixel line may be a gate line 26 instead of being the source line 27, 127, 227, or 327. In that case, the signal supply unit is a gate circuit unit 14 that supplies the gate line 26 with a signal.

(14) It is also possible to divide the display area AA into unequal areas. For example, the first area A1 and the second area A2 may be more or less different in area ratio from each other.

(15) It is also possible to omit the pixel electrode overlap opening 25A of the common electrode 25 and provide the pixel electrode 24 or 224 with a common electrode overlap opening. Further, the common electrode 25 may be composed of the first transparent electrode film 41 or 341, and the pixel electrode 24 or 224 may be composed of the second transparent electrode film 43.

(16) The driver 12 may be mounted on the flexible substrate 13 by COF (Chip on Film).

(17) The gate circuit unit 14 may be omitted, and the array substrate 21 or 321 may be mounted with a gate driver having the same function as the gate circuit unit 14. Further, the gate circuit unit 14 may be provided on one side of the array substrate 21 or 321.

(18) The semiconductor film 36, which constitutes the channel portion 23D of the TFT 23, may be polysilicon. In that case, it is preferable that the TFT 23 be of a bottom-gate type or a top gate type including a light blocking film at a lower layer (at which the backlight device is installed) than the channel portion 23D.

(19) The liquid crystal panel 11 or 311 may perform a display in an IPS mode or the like.

(20) The touch panel pattern may be of a mutually capacitive type.

(21) The liquid crystal panel 11 or 311 may be of a reflective type or a semi-transmissive type.

(22) The planar shape of the liquid crystal display device 10 may be a vertically long rectangle, a regular square, a circle, a semicircle, an oval, an ellipse, a trapezoid, or the like.

What is claimed is:

1. A display device including a position input function, the display device comprising:
    a pixel;
    a pixel line through which to transmit a signal that is supplied to the pixel;
    a signal supply unit, connected to one end of the pixel line, that supplies a signal;
    a display area in which the pixel is placed so that an image is displayed and in which the pixel line is placed to extend so as to pass transversely across the display area, the display area being divided into a first area located beside the signal supply unit in a direction of extension of the pixel line and a second area located on a side opposite to the signal supply unit in the direction of extension;
    a first position detecting electrode, placed in the first area, that forms a capacitance with a position input body which performs position input and that detects an input position inputted by the position input body;
    a second position detecting electrode, placed in the second area, that forms a capacitance with the position input body and detects the input position;
    a first position detecting line placed so as to run parallel to the pixel line and overlap the pixel line in the first area and connected to the signal supply unit and the first position detecting electrode;
    a second position detecting line placed so as to run parallel to the pixel line and overlap the pixel line in such a manner as to lie astride the first area and the second area and connected to the signal supply unit and the second position detecting electrode;
    a lower conducting film;
    an upper conducting film placed at a higher layer than the lower conducting film; and
    an intermediate conducting film located midway between the lower conducting film and the upper conducting film,
    wherein
    the first position detecting line is composed of one of the lower conducting film and the upper conducting film,
    the second position detecting line has a first area side second position detecting line constituting portion placed in the first area and composed of the other of the lower conducting film and the upper conducting film, and
    the pixel line is composed of the intermediate conducting film.

2. The display device according to claim 1, wherein
    the first position detecting line is composed of the upper conducting film, and
    the first area side second position detecting line constituting portion of the second position detecting line is composed of the lower conducting film.

3. The display device according to claim 2, wherein
    the second position detecting line has a second area side second position detecting line constituting portion placed in the second area, and
    the second area side second position detecting line constituting portion has a second position detecting electrode connected portion, composed of the upper conducting film and connected to the second position detecting electrode, a part of which overlaps the first area side second position detecting line constituting portion and is connected to the first area side second position detecting line constituting portion through a relay contact hole bored through an insulating film sandwiched between the second position detecting electrode connected portion and the first area side second position detecting line constituting portion.

4. The display device according to claim 3, wherein the second area side second position detecting line constituting portion has a second position detecting electrode unconnected portion composed of the lower conducting film, placed so as to overlap the second position detecting electrode connected portion, and concatenated to the first area side second position detecting line constituting portion.

5. The display device according to claim 3, further comprising a non-position detecting line composed of the lower conducting film, placed so as to overlap the pixel line and the second area side second position detecting line constituting portion in the second area, and unconnected to the first area side second position detecting line constituting portion.

6. The display device according to claim 5, wherein the non-position detecting line is supplied with a common potential.

7. The display device according to claim 3, further comprising an intermediate electrode placed so as to overlap both the second position detecting electrode connected portion and the first area side second position detecting line constituting portion and composed of the intermediate conducting film,
    wherein the intermediate electrode is connected to the first area side second position detecting line constituting portion through a first relay contact hole, bored through an insulating film sandwiched between the intermediate electrode and the first area side second position detecting line constituting portion, that constitutes the relay contact hole, and is connected to the second position detecting electrode connected portion through a second relay contact hole, bored through an insulating film sandwiched between the intermediate electrode and the second position detecting electrode connected portion, that constitutes the relay contact hole.

8. The display device according to claim 3, wherein the first area side second position detecting line constituting portion and the second position detecting electrode connected portion are directly connected to each other through the relay contact hole bored in a communicating manner through a plurality of insulating films sandwiched between the first area side second position detecting line constituting portion and the second position detecting electrode connected portion.

9. The display device according to claim 3, further comprising a light shielding unit, placed so as to overlap at least both the first area side second position detecting line constituting portion and the second position detecting electrode connected portion, that blocks light.

10. The display device according to claim 1, wherein
    the pixel has a longitudinal shape whose lateral direction is the same as the direction of extension of the pixel line, and a plurality of the pixel lines, a plurality of the first position detecting lines, and a plurality of the second position detecting lines are each respectively placed side by side at spacings in a longitudinal direction of the pixel.

11. The display device according to claim 1, further comprising:
a third position detecting electrode that, when the display area is divided into the first area, the second area, and a third area located closer to the signal supply unit than the first area in the direction of extension, is placed in the third area, forms a capacitance with the position input body, and detects the input position; and
a third position detecting line placed so as to run parallel to the pixel line and overlap the pixel line in the third area and connected to the signal supply unit and the third position detecting electrode,
wherein
the first position detecting line is placed in such a manner as to lie astride the first area and the third area, and
the second position detecting line is placed in such a manner as to lie astride the first area, the second area, and the third area.

\* \* \* \* \*